US009626286B2

(12) United States Patent
Gorobets et al.

(10) Patent No.: US 9,626,286 B2
(45) Date of Patent: Apr. 18, 2017

(54) HARDWARE AND FIRMWARE PATHS FOR PERFORMING MEMORY READ PROCESSES

(71) Applicant: SanDisk Technologies Inc., Plano, TX (US)

(72) Inventors: Sergey Anatolievich Gorobets, Edinburgh (GB); Matthew Davidson, Los Altos, CA (US); Gary J. Lin, San Jose, CA (US); Daniel Tuers, Kapaa, HI (US); Robert Jackson, Milpitas, CA (US)

(73) Assignee: SanDisk Technologies LLC, Plano, TX (US)

( * ) Notice: Subject to any disclaimer, the term of this patent is extended or adjusted under 35 U.S.C. 154(b) by 66 days.

(21) Appl. No.: 14/506,067

(22) Filed: Oct. 3, 2014

(65) Prior Publication Data

US 2016/0098344 A1 Apr. 7, 2016

(51) Int. Cl.

| | |
|---|---|
| ***G06F 12/02*** | (2006.01) |
| ***G06F 12/10*** | (2016.01) |
| ***G06F 9/312*** | (2006.01) |
| ***G06F 9/30*** | (2006.01) |
| ***G06F 13/16*** | (2006.01) |
| ***G06F 12/109*** | (2016.01) |
| ***G06F 3/06*** | (2006.01) |
| ***G06F 12/00*** | (2006.01) |

(52) U.S. Cl.

CPC .......... *G06F 12/023* (2013.01); *G06F 3/0626* (2013.01); *G06F 3/0658* (2013.01); *G06F 3/0679* (2013.01); *G06F 3/0688* (2013.01); *G06F 9/30043* (2013.01); *G06F 12/00* (2013.01); *G06F 12/109* (2013.01); *G06F 13/1668* (2013.01); *G06F 2212/251* (2013.01); *G06F 2212/657* (2013.01)

(58) Field of Classification Search

CPC .... G06F 12/023; G06F 12/0238; G06F 12/10; G06F 12/1009; G06F 12/109; G06F 13/1668; G06F 9/30043; G06F 2212/65

See application file for complete search history.

(56) References Cited

U.S. PATENT DOCUMENTS

| | | | |
|---|---|---|---|
| 5,123,101 A | 6/1992 | Sindhu | |
| 5,537,555 A | 7/1996 | Landry et al. | |
| 6,272,609 B1 | 8/2001 | Jeddeloh | |
| 8,094,500 B2 | 1/2012 | Paley et al. | |
| 9,058,284 B1 * | 6/2015 | Ben-Meir | G06F 12/10 |

(Continued)

OTHER PUBLICATIONS

International Search Report and Written Opinion for corresponding PCT Application No. PCT/US2015/051870 mailed Dec. 4, 2015.

*Primary Examiner* — Hal Schnee

(74) *Attorney, Agent, or Firm* — Brinks Gilson & Lione

(57) ABSTRACT

A storage module may include a controller that has hardware path that includes a plurality of hardware modules configured to perform a plurality of processes associated with execution of a host request. The storage module may also include a firmware module having a processor that executes firmware to perform at least some of the plurality of processes performed by the hardware modules. The firmware module performs the processes when the hardware modules are not able to successfully perform them.

20 Claims, 12 Drawing Sheets

(56) References Cited

U.S. PATENT DOCUMENTS

| | | | | |
|---|---|---|---|---|
| 2003/0196059 | A1* | 10/2003 | Satagopan .......... | G06F 13/1615 711/169 |
| 2007/0113030 | A1 | 5/2007 | Bennett et al. | |
| 2007/0283125 | A1* | 12/2007 | Manczak ............ | G06F 11/3466 711/207 |
| 2009/0172261 | A1* | 7/2009 | Prins ................... | G06F 13/1657 711/103 |
| 2010/0172180 | A1 | 7/2010 | Paley et al. | |
| 2012/0063231 | A1* | 3/2012 | Wood ..................... | G11C 16/10 365/185.18 |
| 2012/0173792 | A1* | 7/2012 | Lassa .................... | G06F 9/4843 711/103 |
| 2012/0284460 | A1 | 11/2012 | Guda | |
| 2013/0083843 | A1* | 4/2013 | Bennett .................. | H04N 19/12 375/240.02 |
| 2014/0164688 | A1* | 6/2014 | Lee ......................... | G06F 12/08 711/104 |
| 2014/0195725 | A1* | 7/2014 | Bennett ............... | G06F 12/0246 711/103 |
| 2015/0092854 | A1* | 4/2015 | Orr ........................ | H04N 19/51 375/240.16 |

* cited by examiner

| Logical Group | LG$_i$ | 0 | 1 | ... | k | k+1 | ... | N-1 |

| Physical Group (Metablock) | MB$_j$ | 0 | 1 | ... | k | k+1 | ... | N-1 |
| | MB$_j$ | k | k+1 | ... | N-1 | 0 | 1 | ... | k-1 |

HARDWARE AND FIRMWARE PATHS FOR PERFORMING MEMORY READ PROCESSES

BACKGROUND

Storage modules may manage data storage in response to host commands received from a host. When a host read command is received, the storage module may perform a plurality of processes to determine where the data is stored, retrieve the data, and send the data back to the host. Storage modules may be configured with firmware that a processor of the storage module may execute to perform the processes required to execute the read command. Programming the storage module with firmware may be beneficial because it can successfully handle read requests, even those reads that are complex, while not consuming that much space. However, many read requests may be relatively straight forward, and use of firmware may not be the most efficient way to handle these read requests.

SUMMARY

Embodiments of the present invention are defined by the claims, and nothing in this section should be taken as a limitation on those claims. By way of example, the embodiments described in this document and illustrated in the attached drawings generally relate to a storage module and related methods of a controller that executes context commands on a communications bus in accordance with a cache sequence while a memory module performs internal memory operations.

In one example, a storage module may include at least one memory; and a controller in communication with the at least one memory. The controller may include: a hardware path that includes a plurality of hardware modules configured to perform a plurality of processes associated with executing host read requests. The controller may also include a firmware module that includes firmware stored in the at least one memory; and a processor configured execute the firmware to perform at least some of the plurality of processes associated with executing host read requests. The controller may also include a front-end module configured to receive a host command, and in response to receipt of the host command, determine whether to start execution of the host command along the hardware path or with the firmware module.

In sum, a hardware path may be included in a controller of a storage module that includes at least one hardware module configured to perform at least one process related to execution of a host request. Execution of a host request may be accelerated when the processes are performed, at least in part, by the at least one hardware module.

These and other embodiments, features, aspects and advantages of the present invention will become better understood from the description herein, appended claims, and accompanying drawings as hereafter described.

BRIEF DESCRIPTION OF THE DRAWINGS

The accompanying drawings, which are incorporated in and constitute a part of this specification illustrate various aspects of the invention and together with the description, serve to explain its principles. Wherever convenient, the same reference numbers will be used throughout the drawings to refer to the same or like elements.

DETAILED DESCRIPTION

Various modifications to and equivalents of the embodiments described and shown are possible and various generic principles defined herein may be applied to these and other embodiments. Thus, the claimed invention is to be accorded the widest scope consistent with the principles, features, and teachings disclosed herein.

Figure 1:
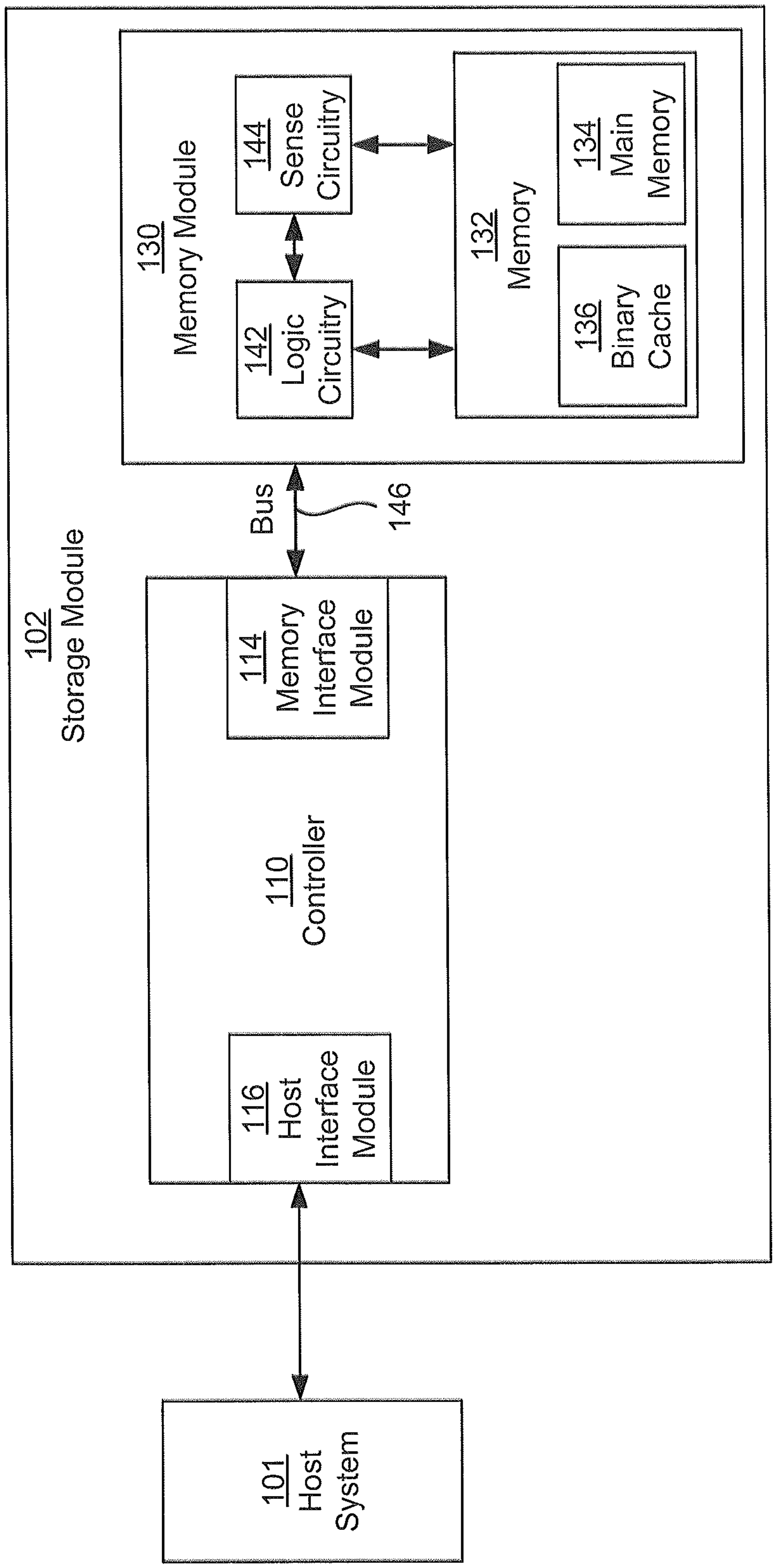
FIG. 1 is a block diagram of an example storage system.

FIG. 1 shows a block diagram of an example system 100 that includes a host system 101 and a storage module 102. The host system 101 may be configured to store data into and retrieve data from the storage module 102. The storage module 102 may be configured to perform memory management functions that control and manage the storage and retrieval of the data. As shown in FIG. 1, the storage module 102 may include a controller circuit 110 and a memory module 130. Depending on the configuration of the storage module 102, the controller 110 and the memory module 130 may be on the same or different substrates.

The controller 110 may include a memory interface module 114 that interfaces with the memory module 130. The controller 110 may also include a host interface module 116 that configures the storage module 102 operatively in communication with the host system 101. As used herein, the phrase "operatively in communication with" could mean directly in communication with or indirectly in communication with through one or more components, which may or may not be shown or described herein. The controller 110, through or using the host interface module 116, may receive host requests, such as host read and write requests, from the host system 101, and send, through or using the host interface 116, responses to the host read and write requests to the host system 101. Additionally, the host interface 116 may take any suitable form, such as, but not limited to, an eMMC host interface, a UFS interface, and a USB interface, as examples.

The memory module 130 may include memory 132 configured to store data or other information in the storage module 102. The memory 132 may include a plurality of memory elements or cells, each configured to store one or more bits of data. In addition or alternatively, the memory 132 may include a single type of memory (such as a single type of volatile memory or a single type of non-volatile memory) or different types of memory (such as different types of volatile memory, different types of non-volatile memory, or combinations thereof).

In addition, the memory 132 may be a single physical space (such as a single die or a single chip) in which the controller 110 may use the same bus or channel to access the single physical space. Alternatively, the memory 132 may include multiple, different physical spaces (such as multiple dies or multiple chips) in which the controller 110 may use different buses or different channels to access the different physical spaces.

The memory 132 may have an organizational arrangement or hierarchy under which the memory elements or cells of the memory 132 may be organized. The controller 110 may be configured to store data and/or access stored data in accordance with the organizational arrangement or hierarchy.

For some example configurations of flash memory, the memory elements may be divided or organized into blocks, with each block containing the minimum number of memory elements that may be erased together. Each block may be further divided into a number of pages, with each page being a unit of programming or reading. Each individual page may further be divided into segments, with each segment containing the fewest number of memory elements that may be written at one time as a basic programming operation. Additionally, for some example configurations, multiple blocks and pages may be distributed across multiple planes and operated together as metablocks and metapages, respectively. Alternatively, the distribution of blocks and pages may be confined to a single plane. Further, multiple planes over which a metablock may be distributed may be grouped into banks. Each bank may be one metablock or one metapage wide. In addition, each bank may be independently managed by the controller 110.

Data may be stored in a block and/or a metablock in various ways, including non-contiguously (randomly) or contiguously. As used herein, and unless otherwise specified, the terms “block” and “metablock” and the terms “page” and “metapage” may be used interchangeably and/or referred to collectively as “metablock” and “metapage” respectively, without concern for whether the block/metablock and page/metapage span a single plane or multiple planes.

The memory elements may be configured as single-level cells (SLCs) that store a single bit of data per cell, multi-level cells (MLCs) that store multiple bits of data per cell (e.g., two bits of data per cell), triple-level cells (TLCs) that store three bits of data per cell, or combinations of SLCs, MLCs, and TLCs. Accordingly, a block or page of memory elements may respectively store a single block or page of data or multiple blocks or pages of data, depending on whether the memory elements are configured as SLCs, MLCs, and/or TLCs. Whether a memory element is a SLC, a MLC, or a TLC may depend on the number of bits the controller 110 determines to program into the memory element. For example, the controller 110 may be configured to program a single bit of data into a memory element, in which case the memory element is configured as a SLC. Accordingly, each of the memory elements may be configured in a SLC mode, a MLC mode, or a TLC mode, as determined by how the controller 110 programs the respective memory elements.

In addition, for some example configurations, the memory 132 may include a single area. For other example configurations, the memory 132 may be divided or separated into different areas or portions, including a main memory 134 and a secondary memory 136, as shown in FIG. 1. The main memory 134 and the secondary memory 136 may be different in that they may be of different memory types, may be located in different physical spaces, have different cell configurations, or some combination thereof.

For some example flash memory applications, the secondary memory 136 may be a binary cache 136. The main memory 134 may have a higher bit-per-cell storage density than the binary cache 136. That is, the memory elements of the main memory 134 may be configured as MLCs, whereas the memory elements of the binary cache 136 may be configured as SLCs. In alternative example configurations, the memory elements of the main memory 134 may also be configured as SLCs. In addition, the binary cache 136 may be configured to allow for a finer granularity of writes than for the main memory 134. The finer granularity may be more compatible with the granularity of logical data units from a host write request. In addition or alternatively, the main memory 134 may be configured to store logical data units sequentially, whereas the binary cache 136 may or may not store logical data units sequentially. Accordingly, fragments of data (e.g., less than a metablock or logical group of data) may be stored in the binary cache 136. For some situations, the data fragments may be subsequently reassembled in sequential order in the blocks in the main memory 134.

The memory module 130 may further include logic circuitry 142 configured to control and/or manage the storage of data in the memory. The logic circuitry 142 may provide an interface between the controller 110 and the memory 132. The logic circuitry 142 may control and/or manage the storage of data in the memory 132 in response and/or according to context instructions or commands, such as sense, program, and/or erase commands, received from and/or generated by the controller 110. The logic circuitry 142 may be configured to perform various memory management functions to control and/or manage the data storage, including, but not limited to, addressing, data transfer, sensing, row and column decoding, and/or gate biasing. Additionally, the memory controller 142 may be implemented in hardware, including one or more processors, hardware logic, buffers, voltage generators, and/or other circuitry to perform the functions of the memory controller 142.

The memory module 130 may further include sense circuitry 144, which may include sense amplifiers configured to sense data stored in the memory 132 and latches configured to store the sensed data, which may then be transferred to the controller 110.

FIG. 1 shows the controller 110 and the logic circuitry 142 as separate components of the storage module 102. However, for alternative example configurations, the logic circuitry 142 and/or the functions performed by the logic circuitry 142 may be incorporated into the controller 110, and the controller 110 may be configured to communicate directly with the memory 132 and/or the sense circuitry 144.

The storage module 102 may also include a communications bus 146 that provides a communications link between the controller 110 and the memory module 130. The communications bus 146 may be used by the controller 110 and the memory module 130 to communicate data, commands, or other information or messages in order to execute host requests or commands received from the host system 101, such as host read and write requests.

When the storage module 102 receives a host read request from the host system 101, the storage module 102 may be configured to perform a plurality of processes in order to execute or carry out the host read request. Such processes may include: front-end command parsing; address translation; data retrieval; post data retrieval; and host communication.

Figure 2:
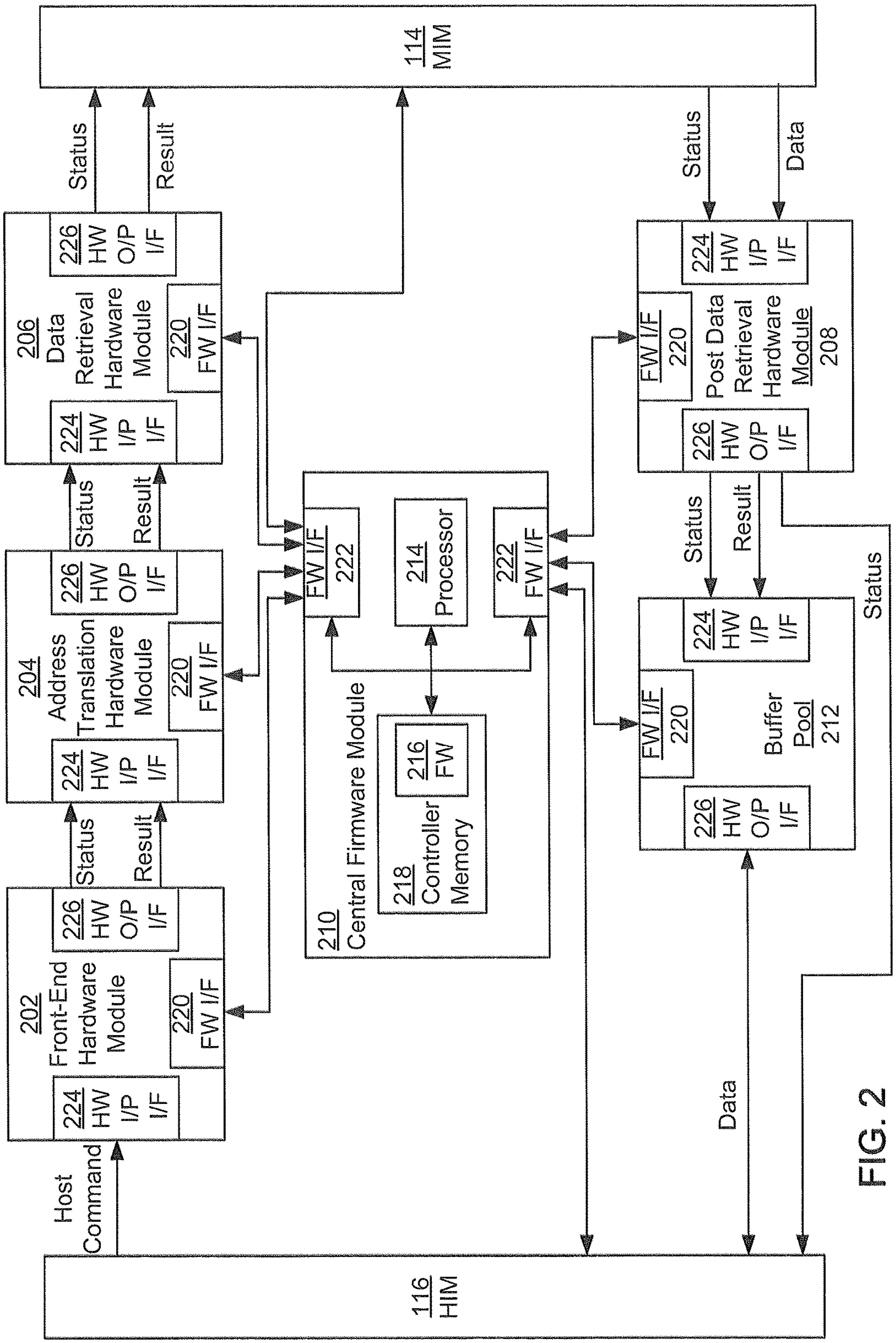
FIG. 2 is a block diagram of an example configuration of components of the controller of FIG. 1 that execute a host read request.

FIG. 2 shows an example configuration of components of the controller 110 that may be used to perform the plurality of processes for execution of a host read request. As shown in FIG. 2, the controller 110 may include a plurality of hardware modules 202-208, a central firmware module 210, and a buffer pool 212, along with the host interface module (HIM) 116 and the memory interface module (MIM) 114.

The plurality of hardware modules 202-208 may each be configured to perform an associated process or plurality of processes for execution of a host read command. The plurality of hardware module 202-208 may perform their associated processes with hardware components and/or without executing software or firmware. Example hardware components may include buffers, registers, latches, flip-flops, edge detectors, counters, logic circuits (e.g., AND gates, OR gates, etc.), comparators, operational amplifiers, passive components (e.g., resistors, capacitors, etc.), multiplexers, demultiplexers, masking circuits, and computational circuits (e.g., adders, subtracters, multipliers, dividers, etc.), as non-limiting examples.

All or at least some of these processes may also be performed by the central firmware module 210, which may include a processor or processor circuit 214 that executes firmware (FM) 216 to perform the processes. The firmware 216 may generally include software and/or a set of executable program instructions capable of being stored in a storage medium and executable by the processor 214. The processor 214 may include a single processor or a plurality of processors configured to perform various types of processing, such as co-processing, multi-processing, multi-tasking, parallel processing, remote processing, distributed processing, or the like, in order to perform the host read request processes The processor 214 may be a microprocessor, a microcontroller, an application specific integrated circuit (ASIC), a field programmable gate array (FPGA), or other now known or later developed processing circuitry configured to execute program instructions that may be part of the firmware 216.

As shown in FIG. 2, the firmware 216 may be stored locally or internal to the controller 110 in a controller memory 218, which may be separate or "off-chip" from memory in the memory module 130, and which may include one or more various types of memory structures or technologies of volatile memory, non-volatile memory, or combinations thereof. The processor 214 may use or access the controller memory 218 to perform host read processes. For example, software and/or firmware including program instructions may be stored in the controller memory 218, which the processor 214 may execute to perform the host read processes. As described in further detail below, the controller memory 218 may store other information and/or data internal to the controller 110 other than the firmware 216.

The combination of the hardware modules 202-208 and the central firmware module 210 may provide multiple read process paths or flows, including a hardware read process path and a firmware read process path. Each of the hardware and firmware read processing paths may execute a host read request independent of each other or may communicate with each other in order to execute the host read request. The hardware modules 202-208 may perform read processes as a host read request proceeds along the hardware read process path. The central firmware module 210 may perform the read processes as the host read request proceeds along the firmware read process path.

In general, the plurality of hardware modules 202-208 in the read process path may be implemented in the controller 110 to accelerate execution of host read requests. For some example configurations, each the plurality of hardware modules 202-208 may be configured to perform one or more associated read processes for execution of a host read request if one or more criteria are satisfied. If the one or more criteria are not satisfied, then the central firmware module 210 may perform the read process. In addition, if the one or more criterion is satisfied but the hardware module performing the read process is otherwise unable to perform the read process, then the central firmware module 210 may perform the read process.

Accordingly, execution of a host read request may be handled by the hardware modules 202-208 in the hardware read process path until a read process is unable to be performed by one of the hardware modules 202-208, at which point the firmware module 210 may perform the read process. Thereafter, the firmware module 210 may determine whether to continue processing the host read request along the firmware path, or to pass responsibility for subsequent processing of the host read request back to the hardware path. The firmware module 210 may pass responsibility back to the hardware path if one or more criteria for performing a next read process are satisfied. Otherwise, the firmware module 210 may continue processing the host read request. As such, the hardware modules 202-208 and the firmware module 210 may interact with each other or intertwine the hardware and firmware read process paths such that the hardware modules 202-208 perform the host read processes when they are able to, and the firmware module 210 takes over when they are not.

One criterion may be and/or be related to complexity. If the tasks involved to successfully perform read process are determined to be below and/or within a level of complexity, then the read process may be performed by an associated one of the hardware modules 202-208. Alternatively, if the tasks involved to successfully perform the read process are determined to be above a level of complexity, then that read process may be handled by the firmware module 210.

Another criterion may be and/or be related to commonality. The hardware modules 202-208 may be configured to perform an associated read process when the tasks involved to successfully execute the read process are common or frequently occur, or the host read request itself is identified as being a frequently received type of host read request. Alternatively, the firmware module 210 may perform a read process when the tasks involved to successfully perform the read process are deemed to be uncommon or infrequently occur or the host read request itself is identified as being an infrequently received type of host read request.

For some read processes, complexity and commonality may be related. The less complex a read process is, the more frequently that read process may be performed. Alternatively, the more complex a read process, the less frequently that read process may be performed.

In addition, for some example configurations, the one or more criteria, including the complexity and commonality, may be related and/or correspond to the size of the data that is being requested to be read. As described in further detail below, the hardware modules 202-208 may be configured to process read requests that request data having a size that is within a predetermined amount. The predetermined amount may correspond to a number of logical group numbers used to identify the data requested to be read, a number of logical-to-physical address translations performed to identify one or more physical locations at which the requested data is stored, a number of areas in the memory 132 at which the data may be continuously stored, a number of commands or sets of commands generated and issued to retrieve the data, or combinations thereof.

Further, for some example configurations, the hardware modules 202-208 may be configured to process the simplest read requests, which may require "short reads" to be performed to execute them. Such read requests may be for a size of data that may be identified by and/or correspond to a single logical group number, a single query or single set of queries to one or more address data structures with the single logical group number to identify a physical address at which a most recent version of the data is located, a single area (e.g., a page or a block) in which the data may be continuously stored, and/or a single set of sense and data transfer commands to generate in order to retrieve the data.

Further, whether a particular read process falls within the scope of being handled by one of the hardware modules 202-208 or by the firmware module 210 may be determined independently by each of the hardware modules 202-208 (i.e., on a per-module basis). That is, whether one of the hardware modules 202-208 can perform its associated read process for a particular host read request may or may not determine whether a different one of the hardware modules 202-208 can perform its associated read process for that same host read request.

As shown in FIG. 2, the hardware components used to perform the host read request processes may be modularized into the hardware modules 202-208, with each of the hardware modules 202-208 being configured to independently communicate with the central firmware module 210. In particular, as shown in FIG. 2, each of the hardware modules 202-208 may include a firmware interface (FW I/F) 220 that is configured to communicate with a firmware interface (FM I/F) 222 of the central firmware module 210.

In the event that one of the hardware modules 202-208 determines that it is unable to successfully perform its part of executing a host read request, the hardware module may notify the central firmware module 210 of its failure along with any data or other information associated the host read request that the central firmware module 210 may use to perform the process. In response, the central firmware module 210 may perform the host read request process that the hardware module was unable to perform.

For some example configurations, after performing a particular read process that a hardware module could not perform, the central firmware module 210 may continue to perform the remaining host read request processes for execution of a host read request. For other example configurations, after the central firmware module 210 performs the particular read process, the central firmware module 210 may send the result of the process to one of the hardware modules 202-208 to perform a next host read request process. Thereafter, the hardware modules 202-208 may continue to perform the host read request processes until execution is complete or another host read request process is unable to be performed by the hardware modules 202-208, at which time the hardware module may notify the central firmware module 210. Such interaction between the hardware modules 202-208 and the firmware module 210 may continue until execution of the host read request is complete or otherwise terminated.

In addition, as shown in FIG. 2, each of the hardware modules 202-208 may have a hardware input interface (HW I/P I/F) 224 and a hardware output interface (HW O/P I/F) 226. As explained in further detail below, the first hardware module 202 may receive via its hardware input interface 224 a host command from the hardware interface module 116. Thereafter, each of the hardware modules 202-208 may be configured to output, using their respective hardware output interfaces 226, a "result" output and a "status" output. The result and status outputs that are output may then be received as respective result and status inputs by a hardware input interface 224 of another hardware module.

The result output that a hardware module outputs may include the information that resulted from a host read request process performed by the hardware module. The status output may include an indication of whether the host read request process performed by the hardware module was successful. For some example configurations, the status output may indicate to and/or instruct the hardware module receiving the status input to latch onto or otherwise retain the result output that it is receiving from the other hardware module. Alternatively, if a hardware module receives a status input at an unsuccessful level, the hardware module may ignore any information it is receiving on its result input.

The hardware modules 202-208 may be modularized in various ways, which may depend on the particular read processes performed. In one example configuration, as shown in FIG. 2, the hardware modules 202-208 may include a front-end hardware module 202, an address translation hardware module 204, a data retrieval hardware module 206, and a post data retrieval hardware module 208.

The front-end hardware module 202 may receive host commands received by the storage module 102 via the host interface module 116. The front-end hardware module 202 may be configured to parse the host command to identify a type of the host command. If the host command identified is a command other than a host read command, such as a host write command as an example, then the front-end hardware module 202 may reject the host command and send the host command to the central firmware module 210 for subsequent processing. Alternatively, if the host command is a host read request, then the front-end hardware module 202 may determine logical address information identified in the host read request and output the logical address information as its result output to the address translation hardware module 204. However, if for some reason the front-end hardware module 202 is unable to determine the logical address information, then the front-end hardware module 202 may notify the central firmware module 210. In addition, assuming that the front-end module 202 determined the logical address information, then the front-end hardware module 202 may output its status output at a level indicating that the front-end module received a host read request and successfully determined logical address information in the host read request.

For alternative example configurations, the front-end hardware module 202 may be implemented in firmware—that is it may be part of the firmware module 210. In either case, whether implemented as a hardware module or as part of the firmware module 210, the front-end module may function as an arbiter that initially determines whether a host command is initially processed along the hardware path or the firmware path.

The address translation hardware module 204 may receive the logical address information from the front-end hardware module 202 as its result input. In addition, the address translation module 204 may receive the status output as its status input, identify that the status is successful, and in response, latch on to the result output in order to retain the logical address information.

Further, the address translation hardware module 204 may be configured to translate the logical address information into physical address information identifying a physical location at which data associated with the host read request is stored. If the address translation module 204 is unable to translate the logical address information into physical address information, then the address translation module 204 may notify the central firmware module 210, providing the logical address information. Alternatively, if address translation hardware module 204 determines physical address information, then the address translation hardware module 204 may output the physical address information as its result output to the data retrieval hardware module 206. In addition, the address translation module 202 may output its status output at a level indicating that the address translation module 202 successfully determined physical address information associated with the host read request.

The data retrieval hardware module 206 may receive the physical address information from the address translation hardware module 204 as its result input. In addition, the data retrieval hardware module 206 may receive the status output from the address translation module 204 as its status input, identify that the status is successful, and in response, latch on to the result output in order to retain the physical address information.

Further, the data retrieval hardware module 206 may be configured generate one or more sets of one or more data retrieval commands for retrieval of data associated with the physical address information. As explained in further detail below, an example set may include a sense command and a data transfer command. The sense command may instruct the memory module 130 to sense data into the latches of the sense circuitry 144. The associated data transfer command may instruct the memory module 130 to send the sensed data to the controller 110.

If for some reason, the data retrieval hardware module 206 is unable to generate the data retrieval commands, the data retrieval hardware module 206 may notify the central firmware module 210, providing it with the physical address information. Assuming the data retrieval module 206 is able to generate the data retrieval commands, the data retrieval module 206 may send the data retrieval commands to the memory interface module 114, which in turn may send the data retrieval commands to the memory module 130. In response to the data retrieval commands, the memory module 130 may retrieve data stored in the memory 132 at a location associated with the physical address information.

The data may be sent to the post data retrieval hardware module 208 via the memory interface module 114. In addition, for some example configurations, the memory interface module 114 may also send a status output to the post data retrieval hardware module 208, which may instruct the post data retrieval hardware module 208 to latch on to the data. Upon receipt of the data, the post data retrieval hardware module 208 may perform post data retrieval processes. Example processes may include error correction and decoding. For some example configurations, if the error correction process identifies a bit error rate that is too high and/or it is unable to successfully decode the data, the post data retrieval hardware module 208 may notify the central firmware module 210, providing the data.

If the post data retrieval hardware module 208 is able to successfully perform the post data retrieval processes, the post data retrieval hardware module 208 may send the data as its results output to the buffer pool 212, where the data may be temporarily stored before being sent to the host system 101 for completion of the host read request. In addition, for some example configurations, the post data retrieval hardware module 208 may send a status output to the buffer pool 212, which may notify the buffer pool to latch onto the data.

In addition or alternatively, the post data retrieval hardware module 208 may send a status output to the host interface module 116, which may indicate to the host interface module that data is stored in the buffer pool 212 and is ready to be sent to the host system 101. In response, the host interface module 116 may retrieve the data stored in the buffer pool 212 and send the data to the host system 101.

FIGS. 3-6 show block diagrams of example configurations of the front-end hardware module 202, the address translation hardware module 204, the data retrieval hardware module 206, and the post data retrieval hardware module 208, respectfully.

Figure 3:
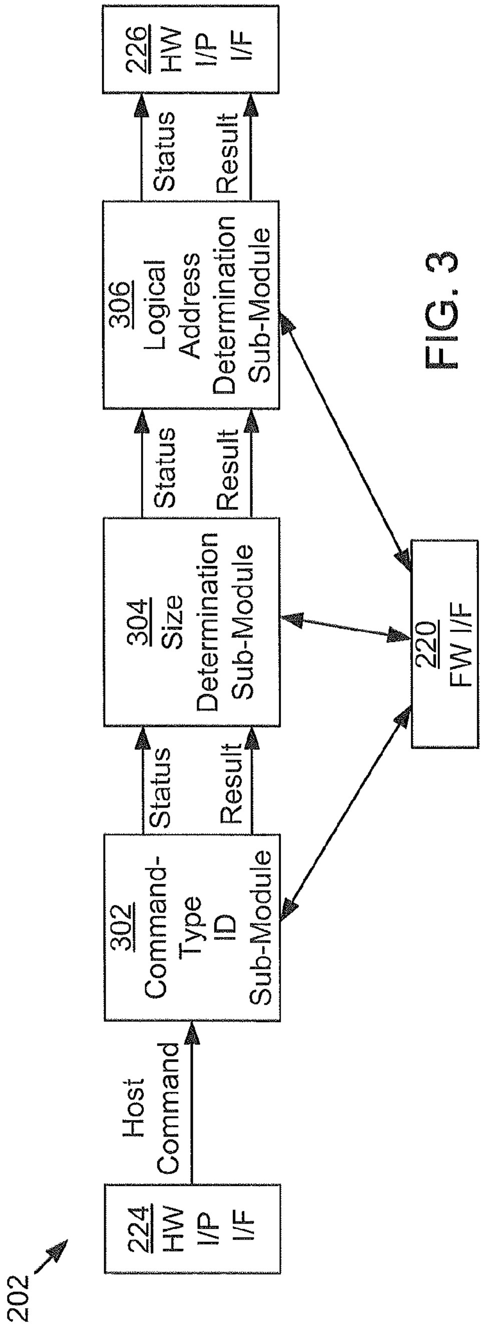
FIG. 3 is a block diagram of an example configuration of the front-end hardware module of FIG. 2.

Referring to FIG. 3, an example configuration of the front-end hardware module 202 may include a plurality of sub-modules 302, 304, 306, each configured to perform a sub-process of the front-end command parsing process. In addition, each of the plurality of sub-modules 302-306 may be configured to send a result output and a status output to a next or downstream sub-module for further processing, and communicate with the firmware interface module 220 in the event that it is unable to perform its associated sub-process.

The plurality of sub-modules may include a command-type identification (ID) sub-module 302, a size determination sub-module 304, and a logical address determination sub-module 306. As shown in FIG. 3, the command-type ID sub-module 302 may be configured to receive a host command from the hardware input interface 224 and parse the host command to identify whether the host command is a host read request or a different type of host command, such as a host write request as an example. As previously described, if the received host command is a command other than a host read request, then the command-type ID sub-module 302 may send the host command to the central firmware module 210 via the firmware interface 220 for subsequent processing. Alternatively, if the command-type ID module determines that the host command is a host read request, then the command-type ID sub-module 302 may send the host read request (or the information parsed from the host read request) as its result output to the size determination sub-module 304 and indicate as its status output that it successfully received a host read command.

In response, the size determination sub-module 304 may latch on to the host read request information received from the command-type ID sub-module 302 and determine a size of the data requested to be read. If the size of the data exceeds a predetermined threshold amount, then the size determination sub-module may determine that the host read request is requesting too large an amount of data to be read for the hardware modules 202-208 to handle. In response, the size determination sub-module 304 may send the host read request information to the central firmware module 210 for subsequent processing.

For some example configurations, the threshold level of data may correspond to a sector or minimum unit of data that may be read out from the memory 132 at a time or per read attempt. In addition or alternatively, the threshold level may correspond to an amount of data that may be received by the controller 110 from the memory module 130 in response to sending a single set of data retrieval commands. Examples threshold sizes may be 4 kilobytes (kB) or 8 kB, although other sizes may be possible. In addition or alternatively, for flash memory, the smallest unit of data may correspond to a page of data. Execution of read requests for data having a size that is less than or equal to the smallest unit of read data may be referred to as a short read request, and execution of a short read request may be referred to as a short read. For some examples, the hardware modules 202-208 may be configured to handle only short reads, and so any read requests that involve reads larger than short reads may be sent to the central firmware module 210 for further processing. For other example configurations, the hardware modules 202-208 may be able to handle host read requests other than short reads.

If the size determination module 304 determines that the size of the data requested be read has not exceeded the predetermined threshold level, then the size determination module 304 may send the host read request information as its result output to the logical address determination sub-module 306.

The logical address determination sub-module 306 may be configured to determine logical address information included in the host read request, which may then be translated by the address translation hardware module 204 (FIG. 2) into a physical address associated with a location at which the requested data is stored. In further detail, for some memory technologies, such as flash memory, the host system 101 and the storage module 102 may use different addressing schemes for managing the storage of data. For example, when the host system 101 wants to write data to the storage module 102, the host system 101 may assign a logical address (also referred to as a logical block address (LBA)) to the data. Similarly, when the host system 101 wants to read data from the storage module 102, the host system 101 may identify the data it wants read by the logical address. The host system 101 may utilize a logical addressing scheme in which a host file system maintains a logical address range for all LBAs assigned or recognized by the host system 101. In addition, for some example configurations, the host system 101 may address data in units of logical sectors. Accordingly, host read and write requests may be requests to read and write a segment comprising a string of logical sectors of data with contiguous addresses.

In contrast to the host system's logical addressing scheme, the storage module 102 may store and access data according to a physical addressing scheme that uses physical addresses different from the logical addresses assigned by the host system 101 to store and access data. To coordinate the host system's logical addressing scheme with the storage module's physical addressing scheme, the storage module 102 may perform address translation in which the storage module 102 translates a logical address included in a host request to a physical address for storage or retrieval of data. As previously described, the memory 132 may be organized or arranged into metablocks. Accordingly, when the memory device 102 performs address translation, the physical address that the memory device 102 determines may identify the metablock, the plurality of metablocks, and/or the physical sectors within a metablock, at which the data is stored.

Figure 7:
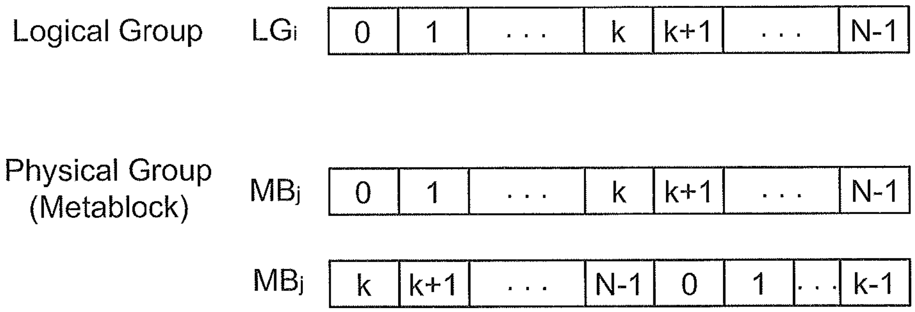
FIG. 7 is a schematic diagram of an example mapping between logical groups and metablocks.

For some example configurations, the logical addresses (LBAs) may be grouped into logical groups (LGs) identified by logical group numbers, and the logical groups may be mapped to the metablocks. FIG. 7 shows a schematic diagram of the mapping between logical groups (LG) and metablocks (MB). Each logical group may be mapped to a unique metablock. Accordingly, as shown in FIG. 7, a metablock may have a N-number of physical sectors for storing N-logical sectors of data associated with a logical group. For some example configurations, the logical sectors of data may be stored in the physical sectors in contiguous and sequential logical order 0, 1, . . . N−1. Alternatively, N logical sectors of data may be stored randomly or discontiguously in N physical sectors of a metablock.

In addition, for some example configurations where data is stored contiguously, there may be an offset between the lowest address of a logical group and the lowest address of the metablock to which it is mapped. In that case, logical sector addresses may wrap around as a loop from the bottom back to the top of the logical group within the metablock. For example, as shown in the bottom diagram of FIG. 7, a metablock $MB_j$ may store data associated with a logical sector k in its first physical sector 0. When the last logical sector N−1 is reached, the logical sectors may wrap around such that the first logical sector 0 is stored contiguously and sequentially after logical sector 0, and the logical sector k−1 is stored in the last physical sector N−1. A page tag may be used to identify any offset, such as by identifying the starting logical sector address of the data stored in the first physical of the metablock.

Referring back to FIG. 3, when the logical address determination sub-module 306 receives the host read request information from the size determination sub-module 304, the logical address determination sub-module 306 may parse the information to determine logical address information in accordance with a mapping scheme, such as the mapping shown in FIG. 7. Example logical address information may include at least one logical group number along with an associated offset, an associated length (size), and an associated bank number. The logical address determination sub-module 306 may output the logical address information as its result output to the address translation hardware module 204, which may then use the logical address information to identify a metablock and/or the physical sector within the metablock at which the data is stored.

For some example configurations, the logical address determination sub-module 306 may be configured to determine a number of logical group numbers that are part of the logical address information. In addition, the logical address determination sub-module 306 may compare the number of logical group numbers with a threshold number. If the number of logical group numbers exceeds the threshold, then the logical address determination sub-module 306 may determine that the host read request is requesting too large an amount of data to be read for the hardware modules 202-208 to handle. In response, the logical address determination sub-module 306 may send the host read request information to the central firmware module 210 for subsequent processing. For some examples, the threshold number may be one. That is, any read requests requesting data associated with multiple logical group numbers may be identified as being a host read request for the firmware module 210 rather than the hardware modules 202-208. Threshold numbers other than one may be possible.

In addition or alternatively, for some example configurations, the size determination sub-module 304 may not be included as a sub-module of the front-end module 202, and the front-end module 202 may determine whether a host read request is requesting too large of data for the hardware modules 202-208 based solely on the number of logical group numbers determined by the logical address determination sub-module 306. For other example configurations, the logical address determination sub-module 306 may not consider the number of logical group numbers, and as long as the size determination sub-module 304 determines the size of the requested data to be within the predetermined value, the logical address determination sub-module 306 may pass the logical address information to the address translation hardware module 204.

Referring back to FIG. 1, the metablocks in the main memory 134 may include or qualify as intact blocks and update blocks. A metablock is as an intact block when it completely (and sometimes sequentially) stores a logical group of data without any of the data being obsolete (i.e., all N physical sectors of the metapage store N logical sectors of data and none of the sectors of data are obsolete). A metablock is an update block when it stores one or more logical sectors of updated data. When an update block is not completely filled with updated data, the update block may be open or available to receive further logical sectors of updated data associated with the same logical group. When an update block is completely filled, it may be closed or no longer available to receive further logical sectors of updated data, at which point the update block may become an intact block.

For example configurations of the memory 132 that includes both the main memory 134 and the binary cache 136, data may be stored in binary cache blocks of the binary cache 136 instead of in metablocks of the main memory 134. The controller 110 may be configured to evaluate various factors or criteria for determining whether certain data is stored in the main memory 134 or in the binary cache 136. One factor may include whether the data to be stored is a data fragment. A data fragment may be data that has a size that is less than a size of a metapage, such that the writing of the data would constitute a partial-page write. To illustrate, suppose a metapage includes eight physical sectors. If certain data to be written only spans two sectors, then that data may be identified as a data fragment for storage in the binary cache 136. Factors other than or in addition to the size of the data may be used to determine whether data is stored in the main memory 134 or the binary cache 136. For example, if an update block currently exists for the data and is available for storage of the data, even if the data qualifies as a data fragment, the controller 110 may determine to store the data in the available update block in the main memory 134 rather than in the binary cache 136.

For some example configurations, fragment headers may be stored with associated data fragments in the binary cache 136. The fragment headers may include a logical group number that identifies the logical group to which the associated data fragment belongs, a sector offset that identifies a particular sector within the logical group, a length identifier that identifies a length of the associated data fragment, and one or more overwrite indicators or flags that identify whether the associated data fragment overwrites corresponding data stored in an update block.

For some situations, in response to a host request to write data, the controller 110 may store the data in both the main memory 134 and the binary cache 136. For example, if the data to be stored is greater than a metapage, the controller 110 may store a first portion having the size of a metapage in an update block in the main memory 134, and a second, remaining portion of the data in the binary cache 136. To illustrate, suppose data to be written requires nine physical sectors. The controller 110 may store eight of the nine sectors of the data in an update block and the remaining sector of data in the binary cache 136.

In addition or alternatively, the controller 110 may store overlapping data in the main storage 134 and the binary cache 136. As an illustration, suppose the controller 110 stores eight sectors of data in a metablock in the main memory 134 in response to a first host write request. Suppose further that the controller 110 receives a second host write request for an update of two of the eight sectors. The controller 110 may store the updated data as a data fragment in the binary cache 136. As another illustration, the controller 110 may receive a first host write request in which two sectors of data are stored as a data fragment in the binary cache 136. The controller 110 may then receive a second host write request for storage of eight sectors, two of which may be for an update of the two sectors of data stored in the binary cache 136.

Alternatively to being stored in the memory 132, some data may be stored in the controller 110, such as in the buffer pool 212 or the controller memory 218 (FIG. 2). Such data may include data that is temporarily stored within the controller 110 before it is sent to either the memory 132 or the host system 101 or data that is intended to be permanently stored in the controller 110.

In order to keep track of where in the storage module 102 data is stored, the storage module 102 may maintain a directory system that maps the relationships or associations between logical addresses and physical addresses. The directory system may include a plurality of address data structures (such as tables, listings, logs, or databases as examples) that track and identify the logical-physical address relationships. The plurality of address data structures may include a primary address data structure (also referred to as a Group Address Table (GAT)) and at least one secondary address data structure. The controller 110 may access the primary and secondary data structures to determine where in the storage module 102 the most recent version of the data is stored.

The primary address data structure (GAT) may provide a primary mapping for logical addresses included in the logical address range recognized by the host system 101. Various configurations of the mapping for the GAT are possible. In one example configuration for flash technology, the GAT keeps track of mapping between logical groups of logical sectors and corresponding metablocks. The GAT includes an entry for each logical group, ordered sequentially according to logical addresses. In addition, the GAT may be organized into a plurality of GAT pages, with each GAT page including entries identifying a metablock address for every logical group.

The at least one secondary address data structure may provide logical-physical address mapping for data fragments stored in the binary cache 136, logical-physical address mapping for changes to data, such as data stored in update blocks, and/or some combination thereof.

One example secondary address data structure, referred to as GAT Delta, may track changes to entries and/or include a listing of changed entries in the mappings of the GAT. As previously described, when data is re-written, the new version of the data may be written to another part of the main memory 134, such as in an update block. GAT Delta may map data stored in the update blocks with associated logical groups. For some example configurations, GAT Delta may be part of a Master Index Page (MIP) that, in addition to GAT Delta, includes a Free Block List (FBL) and/or the GAT. The Free Block List may be a list that identifies blocks that are available for storage of data (e.g., for allocation as an update block) and that may be later mapped to logical groups.

Another secondary address data structure may be a Binary Cache Index (BCI) that tracks data fragments in the binary cache 136. The Binary Cache Index may include a plurality of binary cache indices that associate or map the logical groups to which the data fragments belong to the physical locations or addresses in the binary cache 136 at which the data fragments are stored. For some example configurations, the controller 110 may query the BCI for a given data fragment, and in response receive a pointer or other identifier identifying a binary cache block and sector number along with a length of the data fragment.

Other secondary address data structures may be possible. For example, one or more other secondary address data structures may map physical addresses of data stored in the buffer pool 212 or the controller memory 218 with associated logical groups.

The primary and secondary address data structures may be stored in any of the memories of the storage module 102, including the controller memory 218, the main memory 134, and the binary cache 136. In addition or alternatively, some or all of the primary and secondary address data structures may be stored external to the storage module 102, such as in the host system 101. Additionally, for some example configurations, at any given time or for any duration, copies of one or more of the address data structures, or at least portions of the address data structures, may be generated so that for a given address data structure, there are two versions stored in two different locations in the storage module 102. To illustrate, for a given address data structure, one version may be stored in the memory 132, either in the main memory 134 or the binary cache 136 and another may be stored in the controller memory 118, such as in a RAM portion of the controller 118. As another illustration, for a given address data structure, one version may be stored external to the storage module 102, and another version may be stored internal to the storage module 102, such as in the controller memory 218 or in the memory 132. For some example configurations, a main or primary version of the address data structure may be stored in the memory 132 or in the host system 101, and when the controller 110 determines to query or update the address data structure, the controller 110 may create a copy or load a second version in the controller memory 218. If any updates on the copy are made, the version stored in the memory 132 may be similarly updated. Various ways or locations in which the primary and secondary address data structures are stored may be possible.

Figure 8:
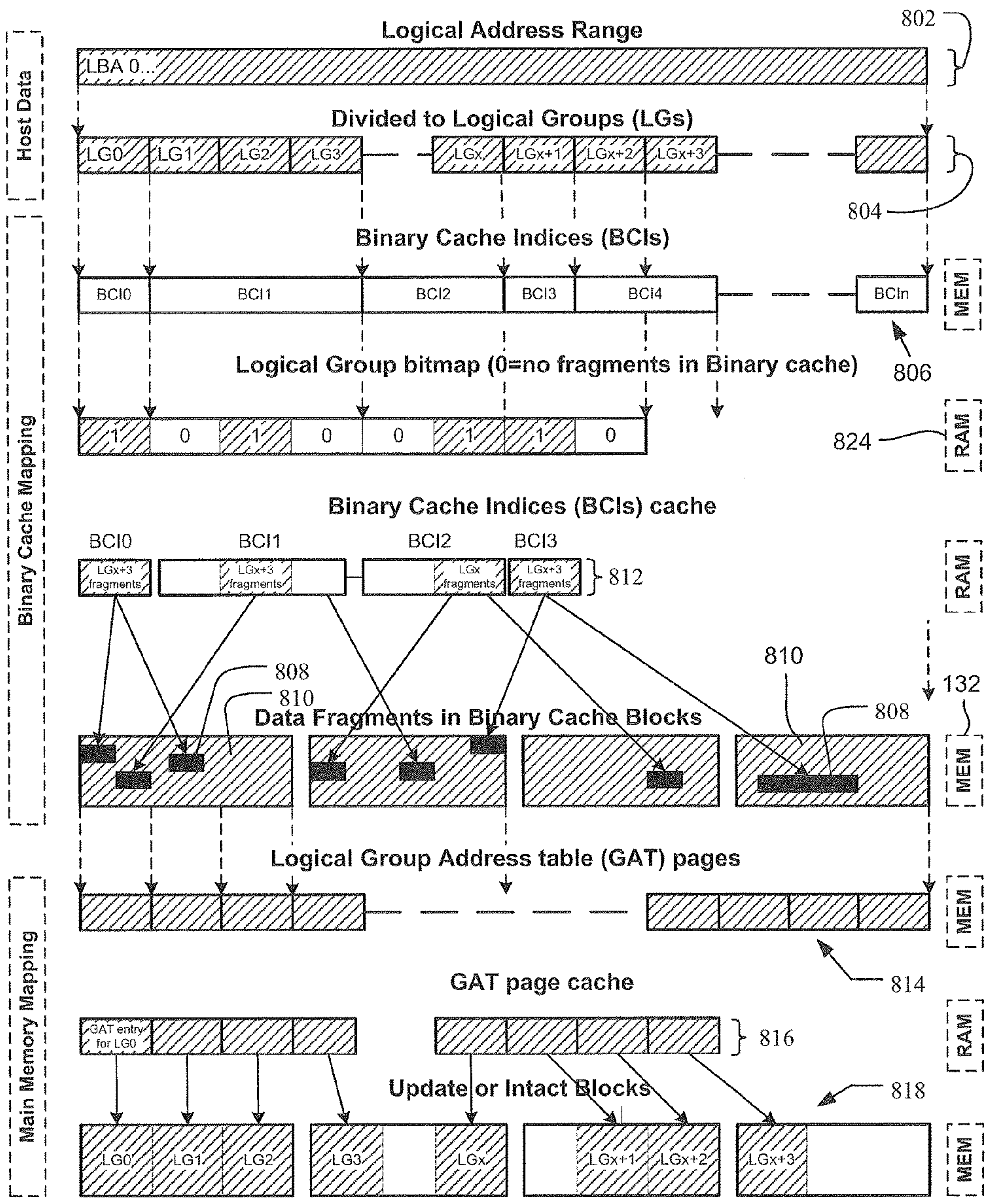
FIG. 8 is a schematic diagram of an example primary and secondary address data structure arrangement.

FIG. 8 shows a schematic diagram of an example primary and secondary address data structure arrangement for flash memory. As shown in FIG. 8, a logical address range 802 for all logical block addresses (LBAs) may be maintained in a host file system utilized by the host system 101. These LBAs may be grouped into logical groups (LGs) 804. As previously described, certain data fragments 808 associated with logical groups 804 may be written into the binary cache 136 rather than to the main memory 134. For the data fragments 808 that are stored in the binary cache 136, binary cache indices 806 may map the logical groups with which the data fragments 808 are associated to the binary cache blocks 810 of the binary cache 136 in which the data fragments 808 are stored. As indicated in FIG. 8, the binary cache indices 806 may be stored in the memory (MEM) 132, either in the main memory 134 or in the binary cache 136. Additionally, a copy of all or a portion of the binary cache indices, identified as BCI cache 812 in FIG. 8, may be maintained (cached) in a RAM portion 824 of the controller memory 218 due to frequent use or recent use. FIG. 8 shows the copy of the binary cache indices 812 maintained in the RAM 824 pointing to the data fragments 808 stored in the binary cache blocks 810. The binary cache indices 806 stored in the binary memory 132 may similarly point to data fragments 808 stored in the binary cache blocks 810.

The primary address data structure (GAT), which includes GAT pages 814, may be stored in the memory 132. In addition, a copy of some or all of the GAT pages 814 in addition to GAT Delta, identified collectively as GAT page cache 816 in FIG. 8, may be maintained (cached) in RAM 824. Also, for the example arrangement shown in FIG. 8, GAT Delta may also be maintained in RAM 824, although all or a portion of GAT Delta may be additionally or alternatively stored in the main memory 134 for other example arrangements. FIG. 8 shows the GAT pages and GAT Delta 816 maintained in RAM 824 pointing to data stored in update and intact blocks 818 of the main memory 134. The GAT pages 814 stored in the memory 132 may similarly point to data stored in the update and/or intact blocks 818.

At any given time, entries in the primary address data structure (GAT) may not map a logical group to a physical location in which data belonging to the logical group is stored, and/or may not map a logical group to a physical location in which the most recent version of the data belonging to the logical group is stored. Where the primary address data structure has a logical-to-physical mapping that is out-of-date, at least one of the secondary address data structures may provide the most up-to-date mapping. Additionally, the secondary address data structures may provide one or more indications, such as through pointers or time stamps, that indicate whether the logical-physical mapping maps to the most recent version of the data.

So that the entries in the primary address data structure are as up-to-date as possible, the controller 110 may be configured to synchronize the mappings in the primary address data structure with the mappings in the secondary address data structures so that the primary address data structure provides mappings to the most recent versions of the data. However, at any given time, a host read request may be received when the primary address data structure has not been synchronized with the secondary address data structures.

In order to ensure that the data that is sent back to the host is the most recent version, the controller 110, using either the address translation hardware module 204, the central firmware module 210, or a combination of the two, may be configured to query all or at least one of the secondary address data structures before retrieving data from the memory module 132 and/or responding to the host. Upon querying a sufficient number of the primary and/or the secondary address data structures, the controller 110 may determine the logical-physical mapping and/or retrieve the physical address that identifies where the most recent version of the data is stored. As such, by querying a sufficient number of the secondary address data structures and/or the primary address data structure, the controller 110 may ensure that the most recent version of the data is sent back to the host system 101.

Figure 4:
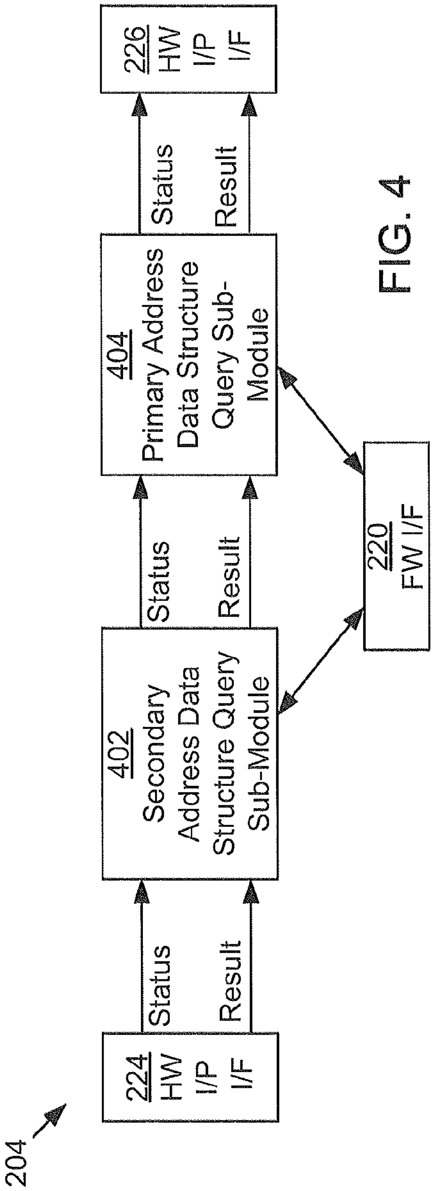
FIG. 4 is a block diagram of an example configuration of the address translation hardware module of FIG. 2.

Referring to FIG. 4, the address translation hardware module 204 may include a secondary address data structure query sub-module 402 configured to query one or more secondary address data structures, and a primary address data structure query sub-module 404 configured to query a primary address data structure. For some example configurations, before the secondary and primary address data structure query sub-modules 402, 404 perform their respective sub-processes, the primary and secondary address data structures that the sub-modules 402, 404 may query may be loaded into the controller memory 218, such as in a RAM portion of the controller memory 218, if they are not already stored there.

The secondary address data structure query sub-module 402 may receive the logical address information as its result input via the hardware input interface 224, and may latch on to the logical address information upon detecting a successful status indication on its status input. Using the logical address information, the secondary address data structure query sub-module 402 may be configured to query all or at least one of the secondary address data structures to determine whether a logical-physical address mapping exists for the logical address information in the secondary address data structures that it is configured to query. Example secondary address data structures may include data structures that track changes to entries and/or include a listing of changed entries in the mappings of the primary data structure, such as GAT Delta or MIP as previously described.

If a logical-physical mapping exists in the secondary address data structures queried, the secondary address data structure query sub-module 402 may identify a "hit," and send the physical address it identified downstream to the primary address data structure query sub-module 404 as its result output. Due to the inherent nature of the secondary address data structures identifying changes to entries and logical-physical mappings of more recent versions of the data, a search in the primary address data structure, such as GAT, may not be performed because such a search may return a logical-physical mapping that is out of date. Accordingly, for some example configurations, in order to avoid a search performed by the primary address data structure 404, the secondary address data structure query sub-module 402 may output its status output at a "bypass" level that indicates to the primary address data structure query module sub-404 to forego performing a query of the primary address data structure and pass the physical address identified by the secondary address data structure query sub-module 402 on to the data retrieval hardware module 206.

Alternatively, if a logical-physical mapping does not exist in the secondary address data structures queried by the secondary address data structure query sub-module 402, then the secondary address data structure query sub-module 402 may send the logical address information to the primary data structure query sub-module 404 as its result output. In addition, the secondary address data structure query sub-module 402 may output its status output at a level that indicates or instructs the primary data structure query sub-module 404 to latch on to the logical address information being received on its result input and perform a query of the primary address data structure, such as GAT, to determine a logical-physical mapping. If the primary address data structure query sub-module 404 is unable to determine a logical-physical mapping, then the primary address data structure query sub-module 404 may notify the central firmware module 210 that the address translation module 204 was unable to determine a physical address for the logical address information it received. Alternatively, if the primary address data structure query module 404 determines a physical address, the primary address data structure query sub-module 404 may output the physical address as its result output.

For some example configurations, at least one of the secondary address data structures may be queried only by the central firmware module 210 and not by the address translation hardware module 204, such as the BCI as an example. A final physical address associated with a most recent version of the data may not be determined with sufficient certainty unless this secondary data structure is queried by the central firmware module 210. For these example configurations, if the front-end module 202 successfully determines logical address information for a host read request, the front-end hardware module 202 may send the logical address information to the central firmware module 210 so that the central firmware module 210 may begin querying the secondary address data structures that are not to be queried by the address translation hardware module 204.

Upon querying the secondary address data structures, if the firmware module 210 does not identify a physical address, then the firmware module 210 may send an enable signal to the data retrieval module 206, which may indicate to the data retrieval module 206 to latch onto the physical address information received from the address translation hardware module 204. Alternatively, if the firmware module 210 identifies a physical address, the firmware module 210 may be configured to determine whether to have the data retrieval hardware module 206 retrieve the data at the physical address, or whether to have the firmware module 210 itself retrieve the data. For some example configurations, the determination may be based on whether the firmware module 210 determines that the data at the physical address by generating and issuing a single set of data retrieval commands. If it can, then the firmware module 210 may send the physical address to the data retrieval hardware module 206. If it cannot, then the firmware module 210 may determine to retrieve the data at the physical address itself.

For some example configurations, the data retrieval hardware module 206 may not perform any actions that cause data stored in the memory 132 to be transferred from the memory module 130 to the controller 110 without receiving notification from the central firmware module 210 and confirming a final physical address associated with the most recent version of the data.

Figure 5:
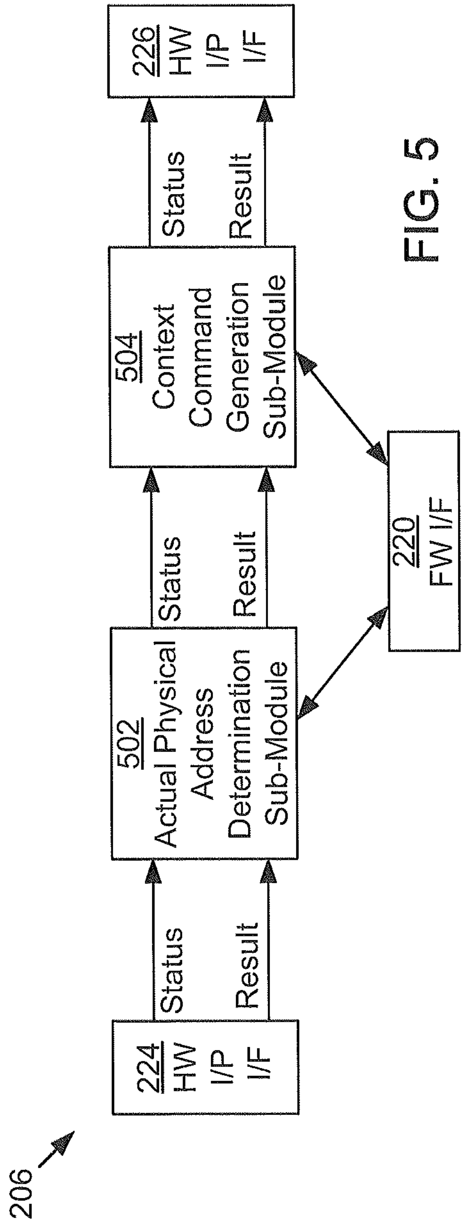
FIG. 5 is a block diagram of an example configuration of the data retrieval hardware module of FIG. 2.

Referring to FIG. 5, an example configuration of the data retrieval module 206 may include an actual physical address determination sub-module 502 and a context command generation sub-module 504. If the actual physical address determination sub-module 502 or the context command generation sub-module 504 are unable to perform their respective sub-processes, they may be configured to notify the central firmware module 210, along with the physical address information.

For some example configurations, the physical address that the address translation hardware module 204 determines is an abstract physical address, such as a metablock number. The actual physical address determination sub-module 502 may be configured to convert the abstract physical address to an actual physical address that identifies the physical aspects of the memory and which may be in a format that the logic circuitry 142 of the memory module 130 can use to sense the data. For some example configurations, the actual physical address determination sub-module 502 may include registers to perform register masking and shifting to determine the actual physical address. The actual address determination sub-module 502 may output the actual physical address as its result output and also output its status output at a successful level.

The context command generation sub-module 504 may latch on to the actual physical address received at its result input and generate one or more sets of data retrieval commands. In general, data retrieval commands may be context commands that the controller 110 executes or issues to the logic circuitry 142 in order to retrieve the data that the host system 101 wants read. The contexts commands may be generated in sets, with each set including a sense command and a data transfer command. The sense command may instruct the logic circuitry 142 of the memory module 130 to sense data stored at a particular actual physical address identified in the sense command. The data transfer command may be generated to cause the data that is sensed to be transferred on the bus 146 to the controller 110. Depending on the size of the data to be read and/or how or where in the memory 132 the data is stored, a single pair or multiple pairs of context commands may be generated, issued, and/or executed.

For some example configurations, the context command generation sub-module 504 may configured to generate a single set of sense and data transfer context commands associated with the host read command. In other words, if the logical and/or physical address information indicates that more than a single set of sense and data transfer commands is needed to retrieve the requested data, such a host read request may be handled by the firmware module 210 rather than the data retrieval hardware module 206.

As previously described, for some example configurations, there may be one or more secondary address data structures that the central firmware module 210 is configured to query without first attempting to be queried by the address translation module 204, such as a query of the BCI. For these configurations, the context command generation sub-module 504 may be configured to refrain from issuing at least the data transfer command before receiving notification from the central firmware module 210 whether the firmware module's 210 query of the secondary data structure yielded a logical-physical mapping. For example, the context command generation sub-module 504 may issue the sense command but may wait until receiving approval from the central firmware module 210 before issuing the data transfer command. For other configurations, the context command generation sub-module 504 may refrain from issuing both the sense command and the data transfer command. If the central firmware module 210 does not identify a logical-physical mapping from the query, then the central firmware module 210 may notify the context command generation sub-module 504 to proceed with the issuing the data transfer command. Alternatively, if the central firmware module 210 identifies a logical-physical address mapping, then the central firmware module 210 may send a notification to the context command generation sub-module 504 that prevents the context command generation sub-module 504 from issuing a data transfer command with the actual physical address determined by the actual physical address determination sub-module 502.

For some example configurations, the central firmware module 210 may send a physical address that it determined from its query to the data retrieval module 206, where the actual physical address determination sub-module 502 may determine a new actual physical address and the context command generation sub-module 502 may generate one or more new sets of sense and data transfer commands using the new actual physical address. Alternatively, the central firmware module 210 may perform those data retrieval actions itself.

Other host read request processes may be performed by the central firmware module 210 and/or the context command generation sub-module 504, with the memory interface module 114, such as sequencing, toggle operations, chip enables, die selections as examples, in order to set up the memory interface module 114 to send the sense and/or data transfer commands to the memory module 130 to retrieve data at an actual physical address determined either by the actual physical address determination sub-module 502 and/or the central firmware module 210. In addition, where the data processing flow is configured only for short reads, the central firmware module 210 may specially configure the memory interface module 114 so that it is configured to only issue context commands for short reads, which may speed up the setup time for the memory interface module 114.

Figure 6:
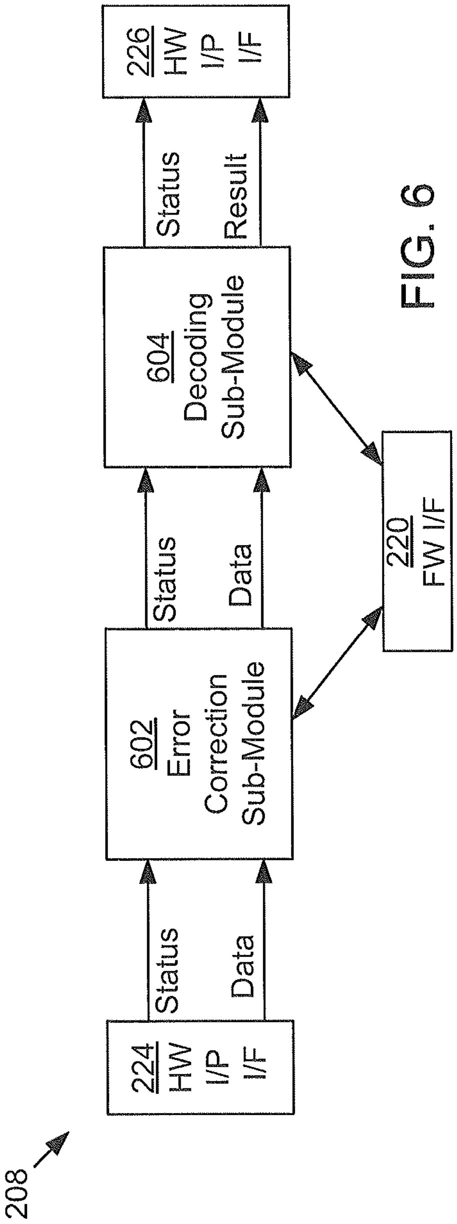
FIG. 6 is a block diagram of an example configuration of the post data retrieval hardware module of FIG. 2.

In response to a data transfer command issued to the memory module 130 data associated with the command that was sensed may be transferred to the post data retrieval hardware module 208. Referring to FIG. 6, an example configuration of the post data retrieval hardware module 208 may include an error correction module 602 and a decoding module 604.

The error correction module 602 may be configured to perform error identification and correction on the data that is retrieved from the memory 132. For example, the error correction module 602 may identify a bit error rate (BER) for the data. If the bit error rate is below a threshold, then the error correction module 602 may determine that the amount of errors is correctable, correct the errors, and pass the data to the decoding module 604. Alternatively, if the error correction module 602 determines that the bit error rate is above a threshold, then the error correction module 602 may determine that it is unable to correct the errors and subsequent error recovery actions may be performed in order recover the data (e.g., read the data with a bit error rate below the threshold). Various example error recovery actions may be possible, including operating the error correction engine in a higher power mode, increasing a number of soft bits, and adjusting the voltage levels applied to the memory to sense the data as non-limiting examples. In general, the error correction module 602 may be configured to notify the central firmware module 210 in the event that it determines that the data sensed has a bit error rate above a threshold level such that error recovery is required. The central firmware module 210 may then perform subsequent error recovery and correction processes.

In the event that the error correction module 602 identifies a bit error rate below the threshold level, the error correction module 602 may correct the errors and then send the corrected data to the decoding sub-module 604. For some example configurations, the decoding may not be necessary, in which case the error correction module 602 may set its status output to a level that indicates to the decoding module 604 to bypass decoding upon receipt of the corrected data. Alternatively, the error correction module 602 may set the status input to a level that causes the decoding module 604 to latch on to the corrected data. The decoding sub-module 604 may then decode the data and output the decoded data to the buffer pool 212 for temporary storage before it is sent to the host system 101. The decoding module 604 may also send a status output to the host interface module 116 to notify the host interface module 116 that the data is stored in the buffer pool and is ready to be sent to the host.

Alternatively, if the decoding sub-module 604 determines that it is unable to successfully decode the data, then the decoding sub-module may notify the central firmware module 210.

Referring back to FIG. 2, before executing a host read command, such as during start-up of the storage module 102, the central firmware module 210 may be configured to setup or preconfigure one or more of the modules 202-208 and their associated sub-modules with any preconfiguration data, such as logical group parameters (e.g., partition boundaries, bank split information, logical group size parameters), and access and load into the controller memory 218 any of the primary and/or secondary address data structures, as examples.

In addition, the hardware modules 202-208 and their associated sub-modules may be modularized in any number of different ways other than the example configurations shown in FIGS. 2-6. For some example implementations, all or some of the hardware modules 202-206 and their associated sub-modules may be considered part of a control path or a control portion of the host read request process flow, which may include those host read request processes performed to retrieve data from memory, whereas the post data retrieval hardware module 208 and its associated sub-modules may be considered as part of data path or a data portion of the host read request process flow, which may include those host read request processes performed on the data after the data has been retrieved from the memory 132 and in order to ensure that the data is in condition for transmission to the host system 101. Various modularization arrangement may correspond to the control and data portions of the host read request process flow. For example, some example configurations of the controller 110 may include hardware modules for the control path but not for the data path, or vice versa. Other ways to modularize a hardware process flow for host read requests may be possible.

Further, although the modularization configurations are described for execution of host read requests, similar modularization schemes may be implemented for other memory management operations, such as execution of host write requests as an example.

Figure 9:
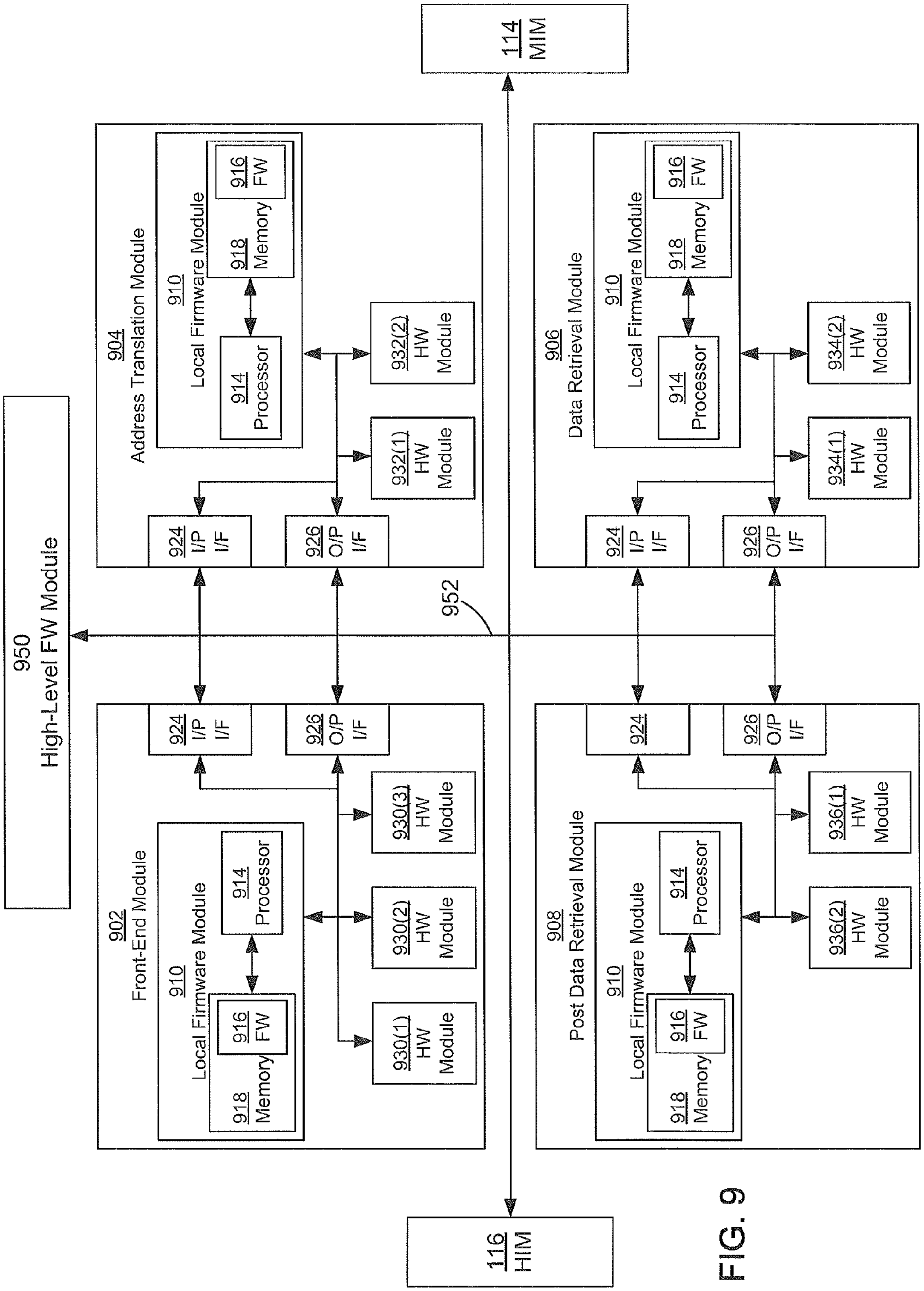
FIG. 9 is block diagram of another example configuration of components of the controller of FIG. 1 that execute a host read request.

FIG. 9 shows a block diagram of another example configuration of components of the controller used to execute a host read request. Similar to the hardware modules 202-208 shown and described with reference to FIG. 2, the example configuration shown in FIG. 9 may include a plurality of host request modules, including a front-end module 902, an address translation module 904, a data retrieval module 906, and a post data retrieval module 908. However, in contrast to the example configuration shown in FIG. 2, which has a plurality of hardware modules 202-208 in communication with a central firmware module 210, each of the host request modules 902-908 may include both hardware modules and a local firmware module 910.

As shown in FIG. 9, each of the host request modules 902-908 may have an input interface (I/P I/F) 924 and an output interface (O/P I/F) 926 to communicate with the other modules 902-908 as well as a high-level firmware 950, the host interface module 116, and the memory interface module 114, using a communications bus 952. The high-level firmware module 950 may control and/or perform other memory management functions, such as executing host read requests, responding to status requests, performing memory relocation (e.g., garbage collection), and managing address directories, as non-limiting examples.

The front-end module 902 is shown as including hardware (HW) modules 930(1), 930(2), and 930(3), which may correspond to the command-type ID sub-module 302, the size determination sub-module 304, and the logical address determination sub-module 306, respectively. The address translation module 904 is shown as including hardware modules 932(1) and 932(2), which may correspond to the secondary address data structure query sub-module 402 and the primary address data structure query sub-module 404, respectively. The data retrieval module 906 is shown as including hardware modules 934(1) and 934(2), which may correspond to the actual physical address determination sub-module 502 and the context command generation sub-module 504, respectively. The post data retrieval module 908 is shown as including hardware modules 936(1) and 936(2), which may correspond to the error correction module 602 and the decoding sub-module 604, respectively.

When a host read request is received, it may be sent from the host interface module 116 to the front-end module 902. The front-end module 902 may process the host read request using the hardware modules 930, the local firmware module 910, or a combination thereof. When the front-end module 902 finishes processing the host read request, it may send logical address information to the address translation module 904, which may use its hardware modules 932, its local firmware module 910, or a combination thereof to translate the logical address information into physical address information. When the address-translation module is finished, the address translation module 904 may output the physical address information to the data retrieval module 906. The data retrieval module 906, using the hardware module 934, its local firmware module 910, or a combination thereof, may generate one or more sets of context commands to retrieve data located at an actual physical address in the memory. The data retrieval module 906 may communicate the context commands to the memory interface module 114, which may send the context commands to the memory module 130 (FIG. 1). In response, the memory module 130 may send the data back to the controller 110 (FIG. 1), through the memory interface 114 to the post data retrieval module 908. In response, the data retrieval module 908, using the hardware modules 936, its local firmware module 910, or a combination thereof, may perform post data retrieval processes such as error correction and/or decoding. For some example configurations, the buffer pool 212 (FIG. 2) may be located within the post data retrieval module 908, and the host interface module 116 may communicate with the post data retrieval module 908 to communicate the data to the host system 101 (FIG. 1).

Figure 10A:
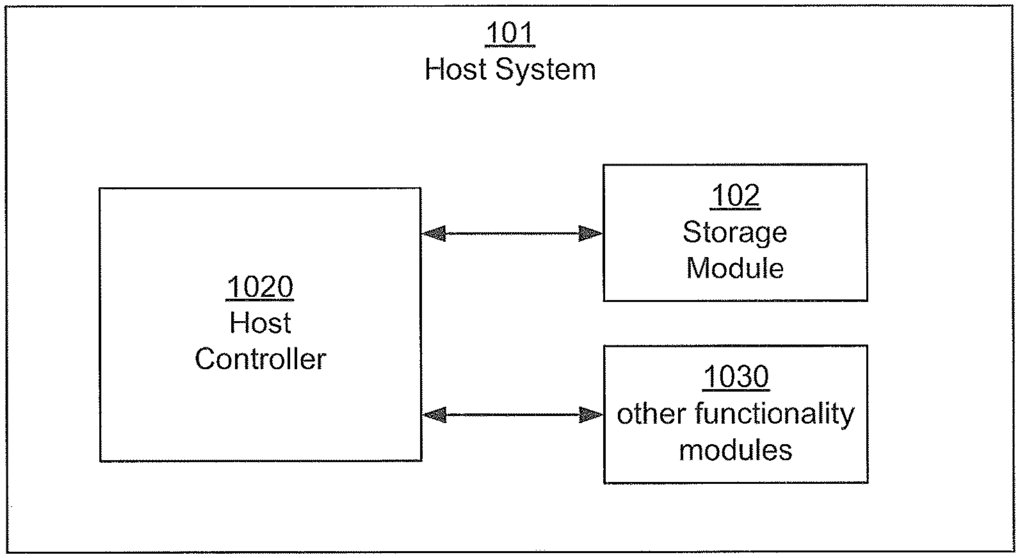
FIG. 10A is a block diagram of the storage module of FIG. 1 embedded in a host.
Figure 10B:
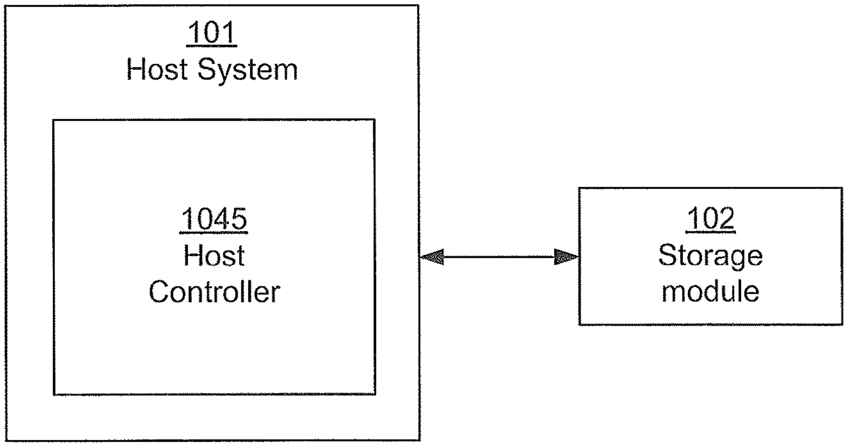
FIG. 10B is a block diagram of the storage module of FIG. 1 removably connected with the host.

For some example configurations, the storage module 102 may be implemented with the host system 101 by being an embedded device of the host system 101 or by being removably connected with the host system 101. FIGS. 10A and 10B show these implementations. As shown in FIG. 10A, the storage module 102 may be embedded in the host system 101. In addition to embedding the storage module 102, the host system 101 may have a host controller 1020. That is, the host system 101 may embody the host controller 1020 and the storage module 102, such that the host controller 1020 interfaces with the embedded storage module 102 to manage its operations. For example, the storage module 102 can take the form of an iNAND™ eSD/eMMC embedded flash drive by SanDisk Corporation. The host controller 1020 may interface with the embedded storage module 102 using the host interface 116 (FIG. 1). Additionally, when the storage module 102 is embedded in the host system 101, some or all of the functions performed by the controller 110 in the storage module 102 may instead be performed by the host controller 1020.

The host system 1010 can take any form, such as, but not limited to, a solid state drive (SSD), a hybrid storage module (having both a hard disk drive and a solid state drive), a memory caching system, a mobile phone, a tablet computer, a digital media player, a game device, a personal digital assistant (PDA), a mobile (e.g., notebook, laptop) personal computer (PC), or a book reader, as examples. As shown in FIG. 10A, the host system 101 can include optional other functionality modules 1030. For example, if the host system 101 is a mobile phone, the other functionality modules 1030 can include hardware and/or software components to make and place telephone calls. As another example, if the host system 101 has network connectivity capabilities, the other functionality modules 1030 can include a network interface. These are just some examples, and other implementations can be used. Also, the host system 101 can include other components (e.g., an audio output, input-output ports, etc.) that are not shown in FIG. 10A to simplify the drawing.

In an alternative configuration shown in FIG. 10B, instead of being an embedded device in a host system, the storage module 102 may have physical and electrical connectors that allow the storage module 102 to be removably connected to the host system 101 (having a host controller 1045) via mating connectors. As such, the storage module 102 may be a separate device from (and is not embedded in) the host system 101. In this example, the storage module 102 can be a removable memory device, such as a Secure Digital (SD) memory card, a microSD memory card, a Compact Flash (CF) memory card, or a universal serial bus (USB) device (with a USB interface to the host), and the host system 102 is a separate device, such as a mobile phone, a tablet computer, a digital media player, a game device, a personal digital assistant (PDA), a mobile (e.g., notebook, laptop) personal computer (PC), or a book reader, for example.

Additionally, referring to FIG. 1, the memory 132 may be a semiconductor memory device that includes volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

Figure 11:
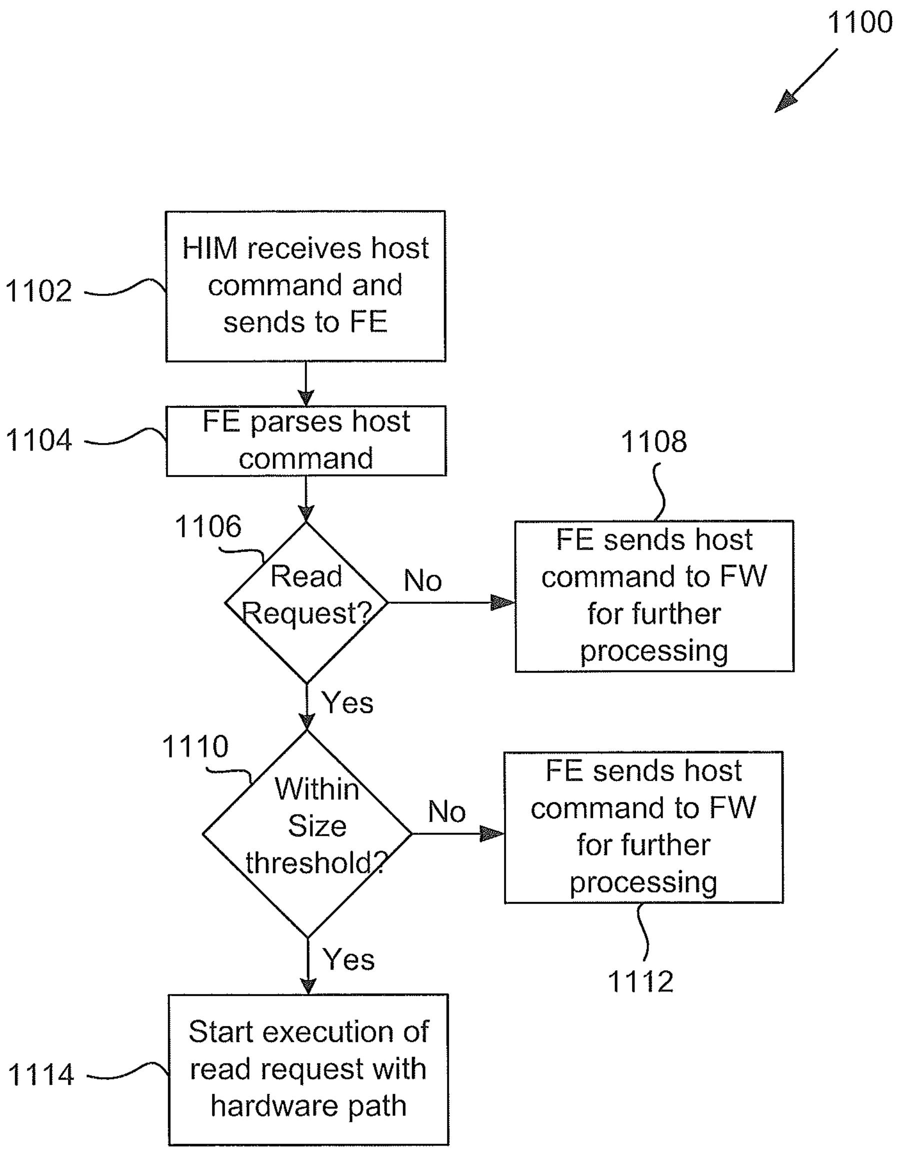
FIG. 11 is a flow chart of an example method of initiating execution of a host read request with a front-end module.

FIG. 11 is a flow chart of an example method 1100 of initiating execution of a host read request with a front-end (FE) module of a controller of a storage module. The controller may include a plurality of hardware modules in a hardware path that are configured to perform processes to execute the host read request. The controller may also include a firmware module that is also configured to perform processes to execute the host read request. At block 1102 a host interface module (HIM) of the controller may receive a host command and send the host command to the front-end module. At block 1104, the front end module may parse the host command for information included in the host command. At block 1106, the front-end module may identify whether the host command is a read request. If the host command is not a host read request, then at block 1108, the front-end module may send the host request to the firmware module for subsequent processing. Alternatively, at block 1106, if the host command is a host read request, then at block 1110, the front-end module may determine if the host read request is a request for data having a size that does not exceed a threshold value or size limit. If it does, then at block 1112, the front-end module may send the host read request to the firmware module for subsequent processing. Alternatively, if the data that is requesting to be read is within the size limit, then at block 1114, the front-end module may determine to start execution of the host read request with the hardware modules in the hardware path.

Figure 12:
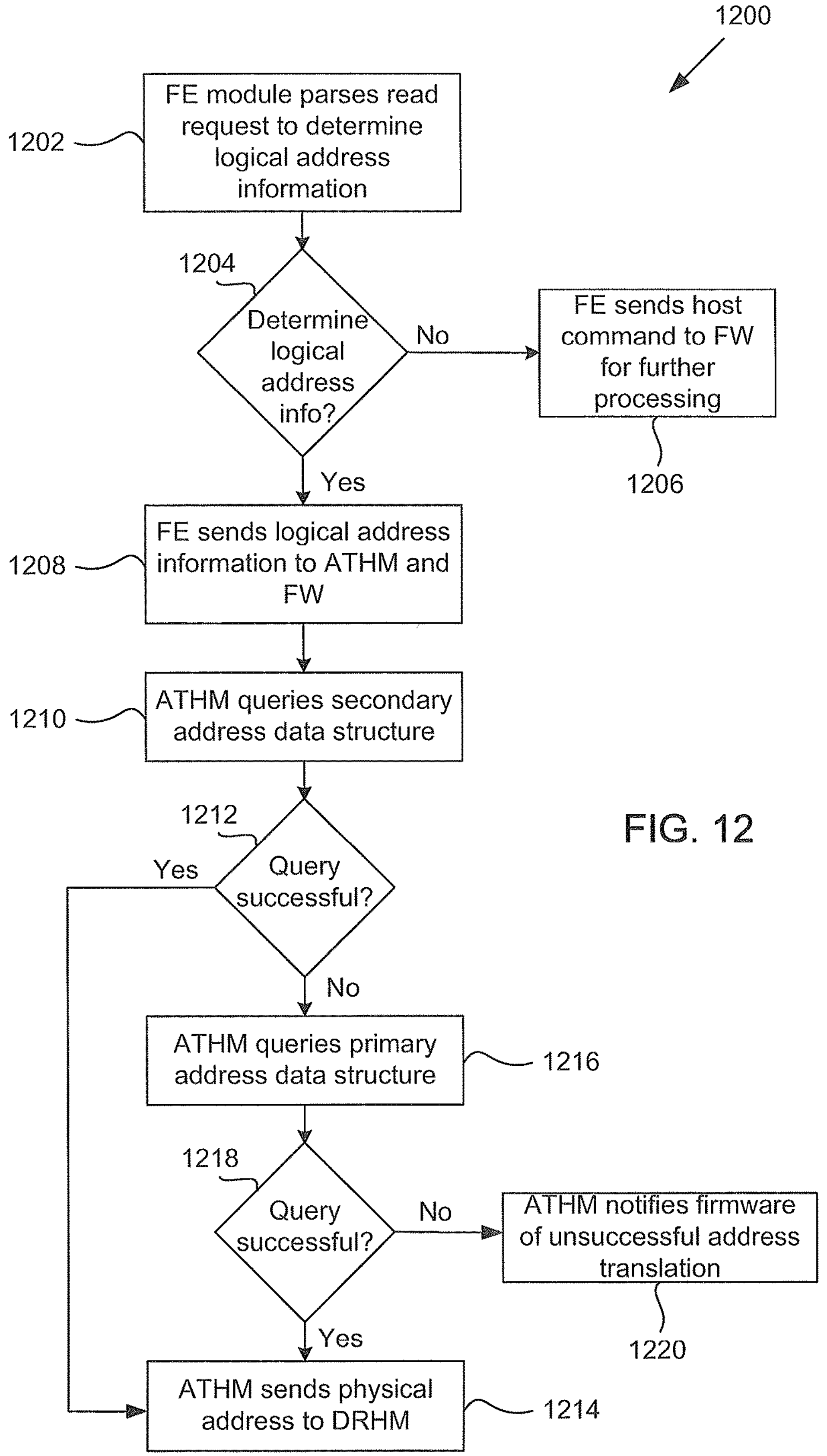
FIG. 12. is a flow chart of an example method of translating a logical address to a physical address in response to starting execution of a host read request in a hardware path.

FIG. 12 is a flow chart of an example method 1200 of translating a logical address to a physical address in response to starting execution of a host read request in a hardware path. At block 1202, a front-end module may parse the read request to determine logical address information identified in the host read request. At block 1204, if the front-end module is not able to successfully determine the logical address information, then at block 1206, the front-end module may send the host read request to the firmware module. Alternatively, if the front-end module is able to successfully determine the logical address information, then at block 1208, the front-end module may send the logical address information to an address translation hardware module (ATHM) in the hardware path. In addition, at block 1208, the front-end module may send the logical address information to the firmware module if there is a secondary address data structure designated exclusively for the firmware module to query.

At block 1210, in response to receiving the logical address information, the address translation hardware module may query the secondary address data structure to determine a logical-physical mapping for the logical address information. At block 1212, if the query is successful and the address translation hardware module determines a logical-physical mapping, then at block 1214, the address translation hardware module may determine to forego querying a primary address data structure and send a physical address associated with the mapping to a data retrieval hardware module (DRHM) for subsequent processing.

Alternatively, if the address translation hardware module does not determine a logical-physical mapping, then at block 1216, the address translation hardware module may query a primary address data structure. At block 1218, if the address translation hardware module determines a logical-physical mapping by querying the primary address data structure, then the method proceeds to block 1214, where the address translation hardware module may send a physical address associated with the logical-physical mapping to the data retrieval hardware module. Alternatively, at block 1218, if the address translation hardware module does not determine a logical-physical mapping by querying the primary address data structure, then at block 1220, the address translation hardware module may notify the firmware module that it was unable to successfully perform address translation and determine a physical address by querying the secondary and primary data structures.

Figure 13:
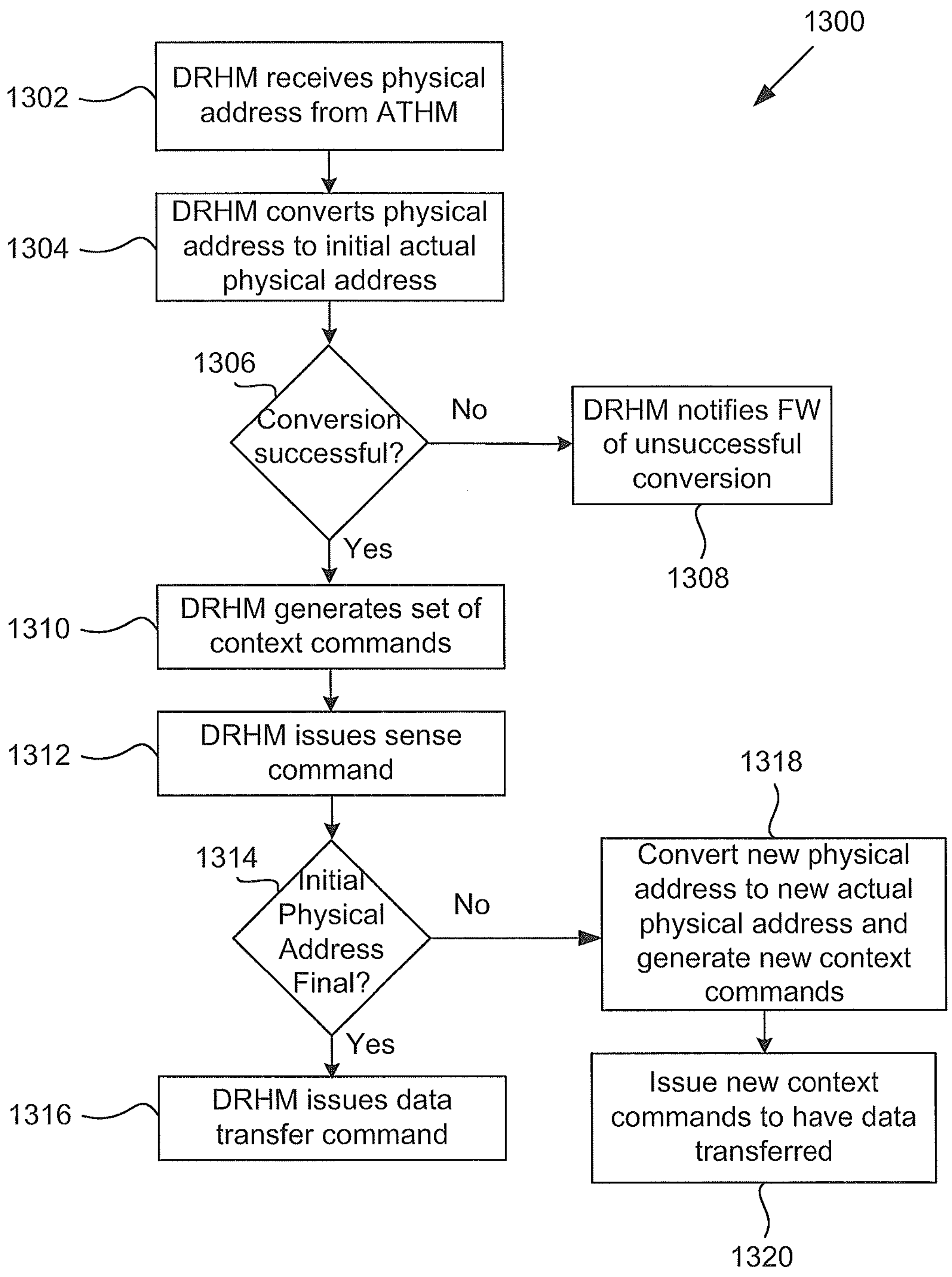
FIG. 13 is a flow chart of an example method of retrieving data stored in memory with a data retrieval hardware module in a hardware path and a firmware module.

FIG. 13 is a flow chart of an example method 1300 of retrieving data stored in memory with a data retrieval hardware module (DRHM) in a hardware path and a firmware module. At block 1302 the data retrieval hardware module may receive a physical address from an address translation hardware module. At block 1304, the data retrieval hardware module may attempt to convert the physical address received from the address translation hardware module, which may be an abstract address, to an actual physical address. At block 1306, if the conversion is not successful, then at block 1308, the data retrieval hardware module may notify the firmware module that it is unable to perform the conversion. Alternatively, if the conversion is successful, then at block 1310, the data retrieval hardware module may be configured to generate a set of sense and data transfer context commands for the actual physical address.

At block 1312, the data retrieval hardware module may issue the sense command to the memory for sensing of the data located at the actual physical address. At block 1314, the data retrieval hardware module may confirm whether the actual physical address that it determined based on the physical address received from the address translation hardware module is a final actual physical address. For some example methods, the data retrieval hardware module may make the confirmation based on information received from the firmware module. For example, referring back to back to the method 1200 in FIG. 12, at block 1208, the front end module may send logical address information to the firmware module, which the firmware module may use to query a secondary data structure that is available exclusively for the firmware module. Referring back to the method 1300 of FIG. 13, if the firmware module failed to determine a logical-physical mapping, then at block 1314, then data retrieval hardware module may determine that the actual physical address it determined based on the physical address received from the address translation hardware module is correct. In response, at block 1316, the data retrieval hardware module may issue the data transfer command to have the sensed data transferred to the controller. Alternatively, if the firmware module determined a logical-physical mapping based on its query, then at block 1318, the data retrieval hardware module may receive a new physical address from the firmware module, convert the new physical address into an actual physical address, and regenerate context commands with the new actual physical address. At block 1320, the data retrieval hardware module may issue the new context commands to have the data sensed and transferred.

Figure 14:
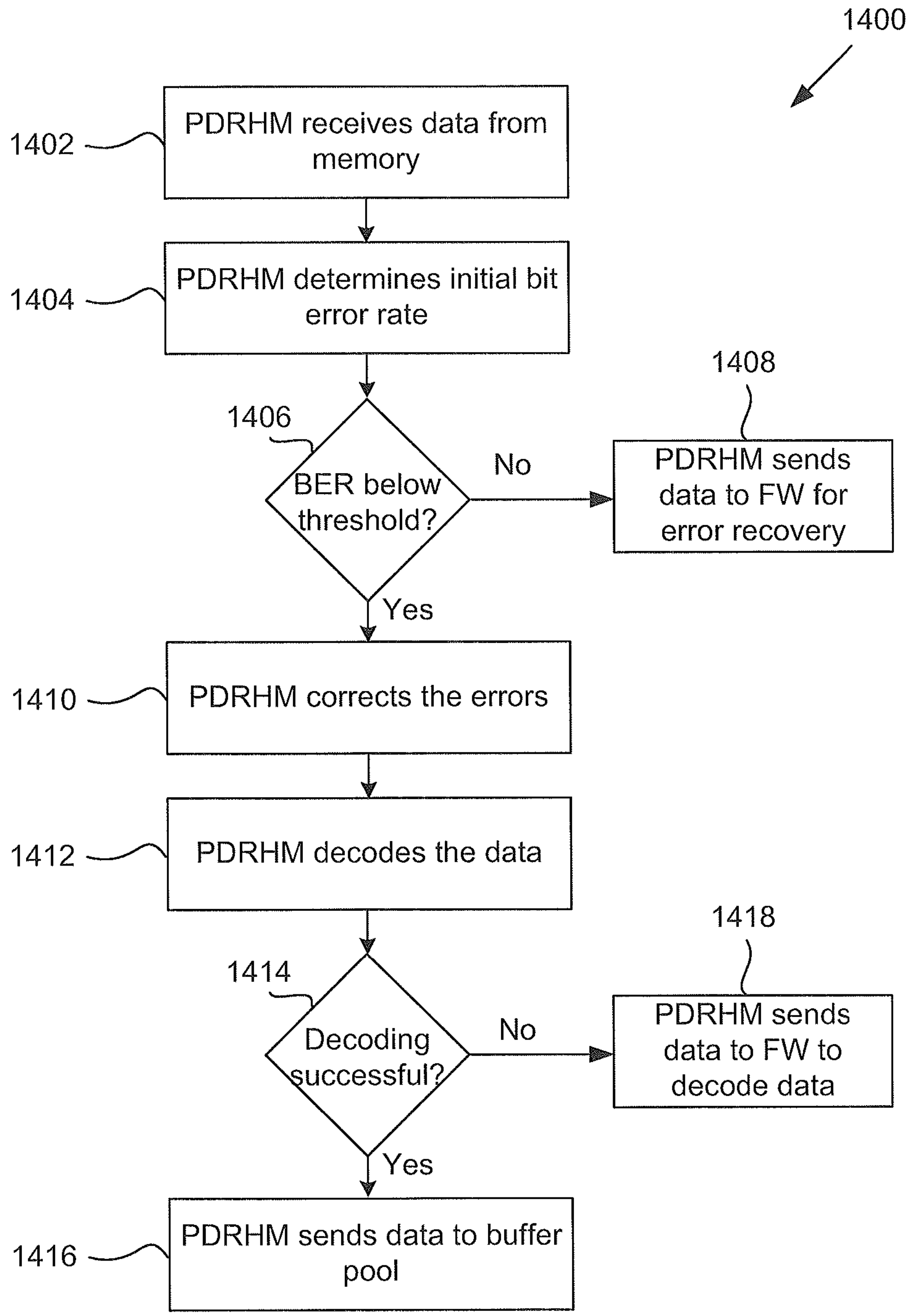
FIG. 14 is a flow chart of an example method of processing data after it has been retrieved from memory with a post data retrieval hardware module in a hardware path and a firmware module.

FIG. 14 is a flow chart of an example method 1400 of processing data after it has been retrieved from memory with a post data retrieval hardware module (PDRHM) and a firmware module. At block 1402, the post data retrieval hardware module may receive the data from the memory. At block 1404, the post data retrieval hardware module may perform an initial error identification to determine whether a bit error rate associated with the read data is below a threshold. At block 1406, if the bit error rate is not below the threshold value, then at block 1408, the post data retrieval hardware module may send the data to the firmware module to perform error recovery to recover and read the data with a bit error rate below the threshold. Alternatively, at block 1406, if the bit error rate is below the threshold, then at block 1410, the post data retrieval hardware module may correct the errors in the data. At block 1412, the post data retrieval hardware module may perform decoding. If at block 1414 the post data retrieval hardware module is able to successfully decode the data, then at block 1416, the post data retrieval hardware module may send the decoded data to a buffer pool for temporary storage before it is sent to the host. Alternatively, if at block 1414 the post data retrieval hardware module is unable to successfully decode the data, then at block 1418, the post data retrieval hardware module may send the data to the firmware module to decode the data.

It is intended that the foregoing detailed description be understood as an illustration of selected forms that the embodiments can take and does not intend to limit the claims that follow. Also, some of the following claims may state that a component is operative to perform a certain function or configured for a certain task. It should be noted that these are not restrictive limitations. It should also be noted that the acts recited in the claims can be performed in any order—not necessarily in the order in which they are recited. Additionally, any aspect of any of the preferred embodiments described herein can be used alone or in combination with one another. In sum, although the present invention has been described in considerable detail with reference to certain embodiments thereof, other versions are possible. Therefore, the spirit and scope of the appended claims should not be limited to the description of the embodiments contained herein.

We claim:

1. A storage system comprising:
- at least one memory;
- a controller in communication with the at least one memory, wherein the controller comprises:
  - a hardware path comprising a plurality of hardware modules, each hardware module configured to perform a different one of a plurality of processes associated with executing host read requests, the plurality of processes comprising address translation and data retrieval command generation, the plurality of hardware modules comprising hardware circuits that do not execute software to perform the plurality of processes; and
  - a firmware module comprising:
    - firmware stored in the at least one memory; and
    - a processor configured execute the firmware to perform the plurality of processes associated with executing host read requests; and
- a front-end module configured to:
  - receive a host command; and
  - in response to receipt of the host command, determine whether to start execution of the host command along the hardware path or with the firmware module.

2. The storage system of claim 1, wherein the front-end module is configured to determine to start the execution of the host command along the hardware path in response to an identification that the host command is a host read request to read data stored in the at least one memory.

3. The storage system of claim 2, wherein the front-end module is further configured to start the execution of the host read request along the hardware path responsive to a size of the data not exceeding a threshold amount.

4. The storage system of claim 3, wherein the threshold amount corresponds to a maximum amount of data that is retrievable by generation of a single set of data retrieval commands.

5. The storage system of claim 2, wherein the plurality of hardware modules comprises an address translation hardware module, wherein the front-end module is further configured to:
- identify logical address information associated with the host read request; and
- responsive to the logical address information comprising a number of one or more logical group numbers that does not generate a threshold number, send the logical address information to the address translation hardware module to identify a physical address mapped to the logical address information.

6. The storage system of claim 5, wherein the threshold number is one.

7. The storage system of claim 5, wherein the address translation hardware module is configured to query at least one address data structure to identify the physical address mapped to the logical address information.

8. The storage system of claim 7, wherein the at least one address data structure comprises at least one of a secondary address data structure and a primary address data structure.

9. The storage system of claim 7, wherein the address translation hardware module is configured to query the at least one address data structure with only a single logical group number associated with the host read request.

10. The storage system of claim 7, wherein the physical address comprises a first physical address, the at least one address data structure comprises at least one first address data structure, the front-end module is further configured to send the logical address information to the firmware module, and the firmware module is further configured to query at least one second address data structure to identify a second physical address mapped to the logical address information.

11. The storage system of claim 10, wherein the plurality of hardware modules further comprises a data retrieval hardware module configured to retrieve the data, the address translation hardware module is further configured to send the first physical address to the data retrieval hardware module to retrieve a first version of the data stored at the first physical address; and the firmware module is further configured to:

responsive to the query of the at least one second address data structure not returning the second physical address, permit the data retrieval hardware module to retrieve the first version of the data; and responsive to the query of the at least one second address data structure returning the second physical address, determine whether to instruct the data retrieval hardware module to retrieve a second version of the data stored at the second physical address, or disable the data retrieval hardware module and retrieve the second version of the data.

12. The storage system of claim 11, wherein the firmware module is configured to instruct the data retrieval hardware module to retrieve the second version of the data responsive to retrieval of the data requiring issuance of a single set of data retrieval commands to retrieve the second version of the data.

13. The storage system of claim 1, wherein the plurality of hardware modules comprises a post data retrieval hardware module configured to:

perform an initial determination of whether data received from the at least one memory has a bit error rate above a threshold level; and responsive to the bit error rate being above the threshold level, send the data to the firmware module for error recovery.

14. The storage system of claim 1, wherein the front-end module is one of the plurality of hardware modules in the hardware path.

15. The storage system of claim 1, wherein one or more of the at least one memory comprises three-dimensional memory.

16. The storage system of claim 1, wherein the controller is on the same substrate as memory elements of the at least one memory.

17. A method of executing a host read request in a storage system comprising at least one memory, the method comprising:

in a controller of the storage system:

receiving the host read request to read data stored in the storage system;

sending the host read request to a hardware path comprising an address translation hardware module comprising a hardware circuit that does not execute software;

querying, with the address translation hardware module, at least one address data structure to identify a physical address; and in response to the address translation hardware module being unable to identify the physical address, sending, with the address translation hardware module, a notification to a firmware module comprising a processor that executes firmware;

in response to the notification, querying, with the firmware module, the at least one address data structure to identify the physical address;

sending, with the firmware module, the identified physical address to a data retrieval hardware module of the hardware path; and with the data retrieval hardware module, retrieving from the at least one memory data stored at the physical address identified by the querying performed with the firmware module.

18. A storage system comprising:

at least one memory; and a controller comprising a plurality of host request modules, each configured to perform a different one of a plurality of processes associated with execution of a host read request, the plurality of processes comprising at least two of: host command type identification, data size identification, logical address information identification, address translation, data retrieval command generation, or post data retrieval processing, and wherein the plurality of host request modules comprises:

a first host request module comprising:

a first hardware module configured to perform a first process of the plurality of processes associated with execution of the host read request; and a first firmware module comprising first firmware stored in the at least one memory, and a first processor configured to execute the first firmware to perform the first process; and a second host request module comprising:

a second hardware module configured to perform a second process of the plurality of processes associated with execution of the host read request; and a second firmware module comprising second firmware stored in the at least one memory, and a second processor configured to execute the second firmware to perform the second process.

19. The storage system of claim 18, wherein the first host request module is configured to determine logical address information identified in the host read request, and the second host request module is configured to determine a physical address based on the logical address information identified in the host read request.

20. The method of claim 17, wherein sending the host read request to the hardware path comprises sending the host read request to the hardware path responsive to a size of the data being less than a threshold value.

* * * * *